United States Patent [19]

Cohen

[11] Patent Number: 5,096,530
[45] Date of Patent: Mar. 17, 1992

[54] RESIN FILM RECOATING METHOD AND APPARATUS

[75] Inventor: Adam L. Cohen, Sherman Oaks, Calif.

[73] Assignee: 3D Systems, Inc., Valencia, Calif.

[21] Appl. No.: 545,517

[22] Filed: Jun. 28, 1990

[51] Int. Cl.[5] .................... B05D 5/12; B29C 35/02
[52] U.S. Cl. ........................ 156/229; 156/246;
156/272.8; 156/273.7; 156/275.5; 156/285;
156/300; 156/378; 156/379; 156/379.8;
156/494; 118/506; 118/620; 264/22; 264/291;
264/510; 264/255; 425/174.4; 427/53.1;
427/54.1; 427/171; 427/412.1
[58] Field of Search ........... 156/59, 60, 272.2, 273.3,
156/273.5, 275.5, 285, 307.5, 379.6, 379.8,
380.9, 390, 444, 494, 598, 229, 246, 272.8, 273.7,
300, 378, 379; 264/22, 510, 298, 255, 291, 308;
425/66, 90, 174, 174.4, 224; 427/53.1, 54.1, 171,
412.1, 412.5; 118/33, 34, 620, 506; 446/15-21

[56] References Cited

U.S. PATENT DOCUMENTS

| | | | |
|---|---|---|---|
| 2,711,051 | 6/1955 | Pick | 446/19 |
| 4,247,508 | 1/1981 | Housholder | 264/308 X |
| 4,303,924 | 12/1981 | Young, Jr. | 427/54.1 X |
| 4,430,363 | 2/1984 | Daniels et al. | 427/54.1 |
| 4,575,330 | 3/1986 | Hull | 425/174.4 |
| 4,654,017 | 3/1987 | Stein | 446/15 |
| 4,783,348 | 11/1988 | Albrecht et al. | 264/298 |
| 4,893,583 | 1/1990 | Jaffa | 118/506 X |
| 4,915,757 | 4/1990 | Rando | 156/330 X |
| 4,938,816 | 7/1990 | Beaman et al. | 264/22 X |
| 4,942,060 | 7/1990 | Grossa | 264/22 X |
| 4,961,154 | 10/1990 | Pomerantz et al. | 264/22 X |
| 5,009,585 | 4/1991 | Hirano et al. | 118/620 X |

Primary Examiner—David A. Simmons
Assistant Examiner—Chester T. Barry
Attorney, Agent, or Firm—Lyon & Lyon

[57] ABSTRACT

Disclosed is a system for fabricating an object by selective curing of successive films of curable resin formed separately from the object being formed. In a first preferred embodiment, a thin film is formed and selectively cured and stripped to form a layer of an object of predetermined pattern. In a second preferred embodiment, a carousel of funnels carries out parallel film formation and curing. A third preferred embodiment is disclosed having rotating carriers to achieve parallel film formation and curing. A fourth preferred embodiment is disclosed for forming very small objects of successive thin films.

52 Claims, 15 Drawing Sheets

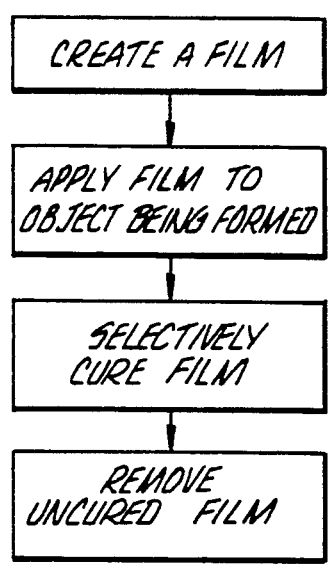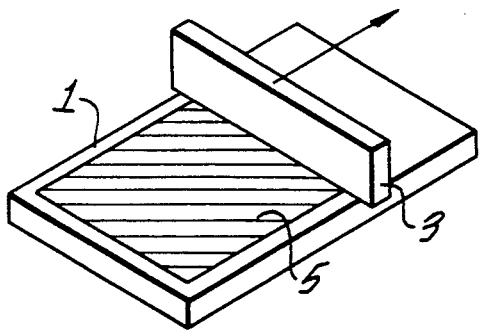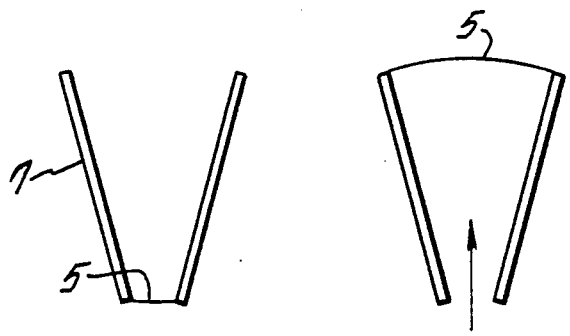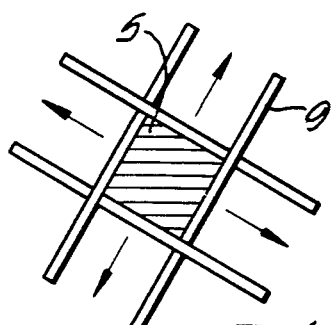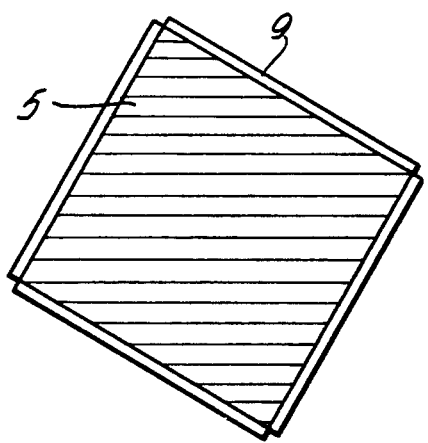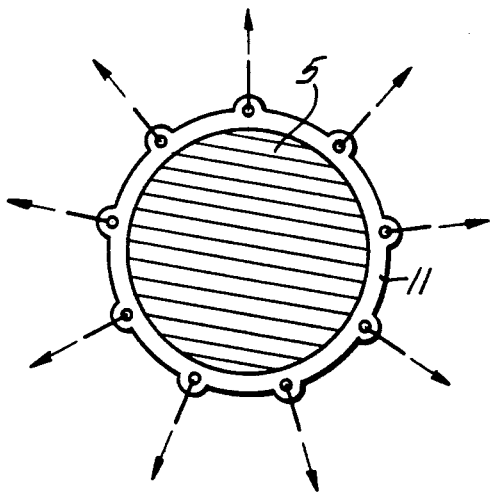

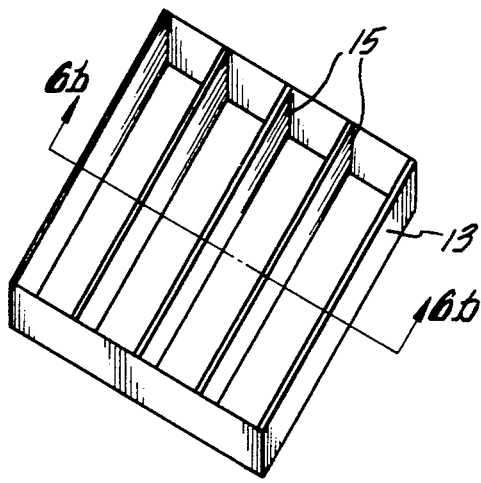
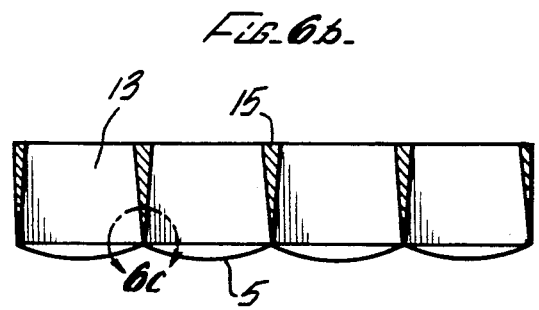
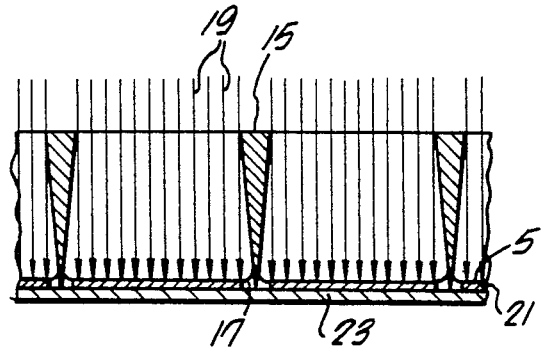
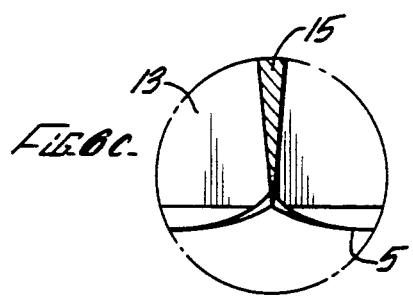
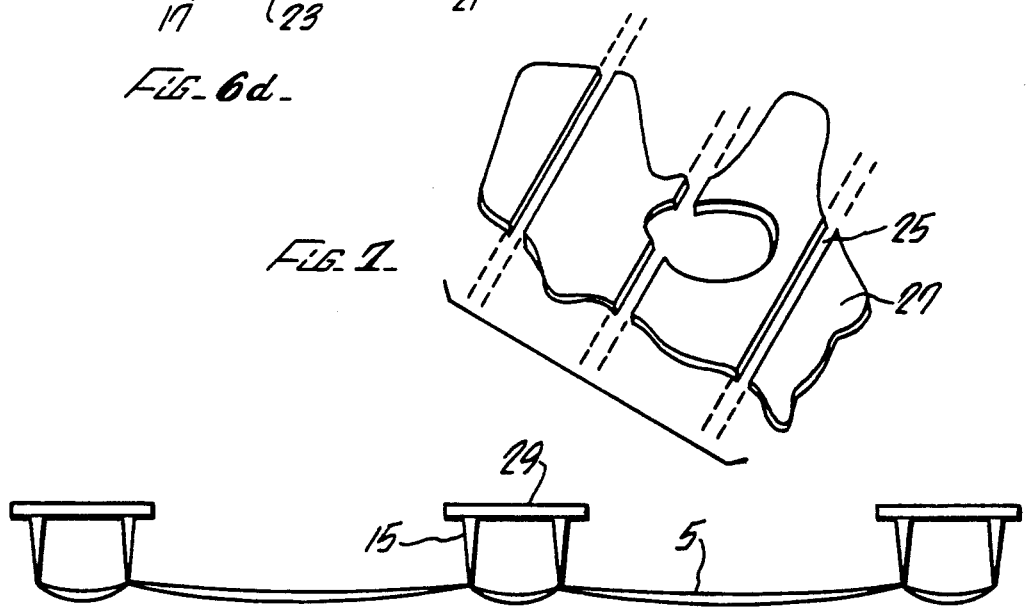

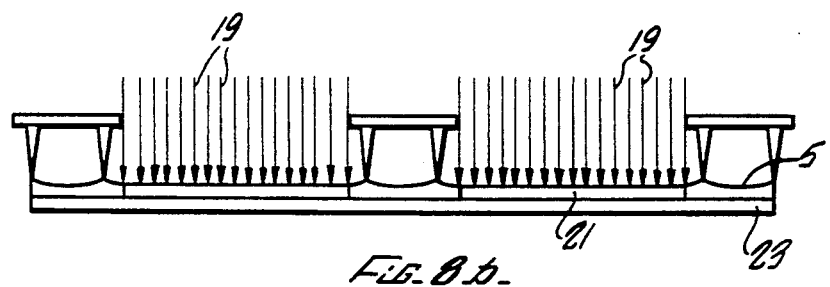
FIG. 8b.
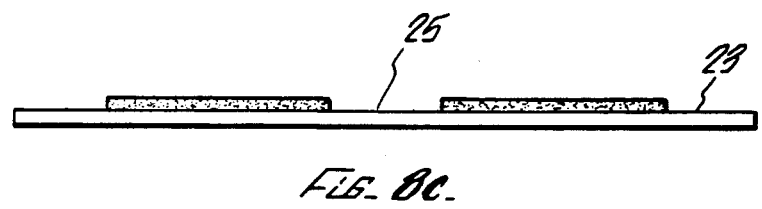
FIG. 8c.
FIG. 8d.
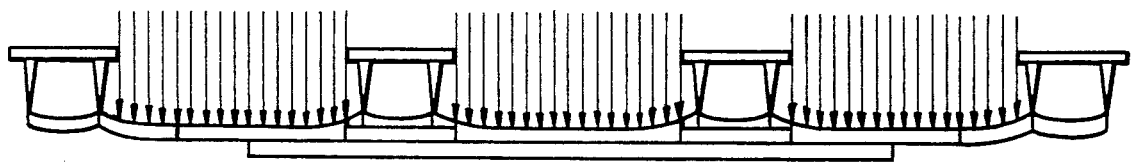
FIG. 8e.
FIG. 9a.
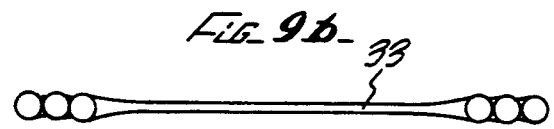
FIG. 9b.

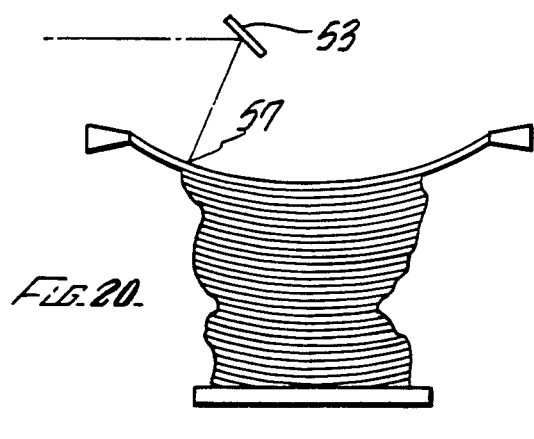
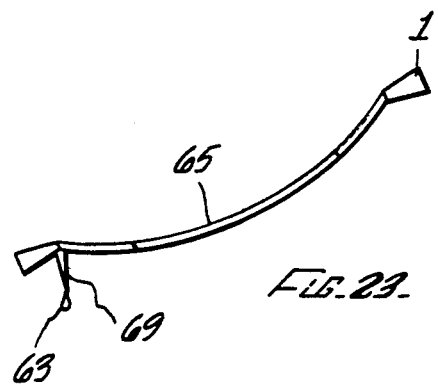
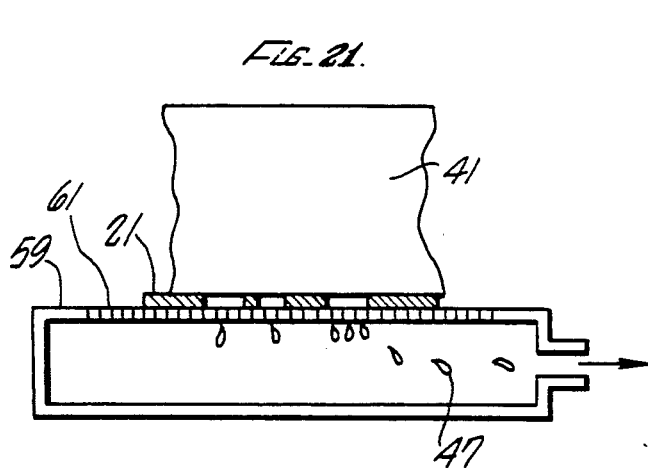
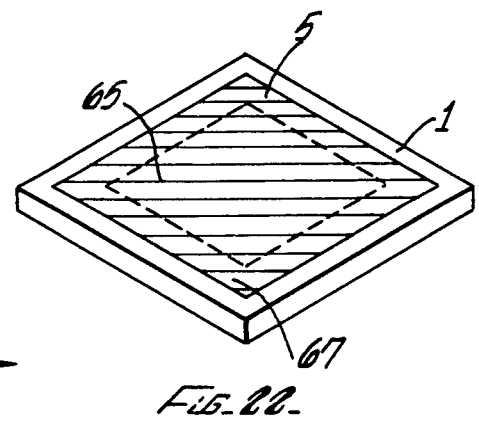
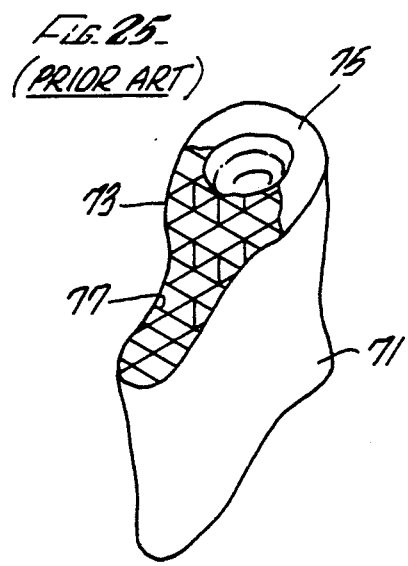
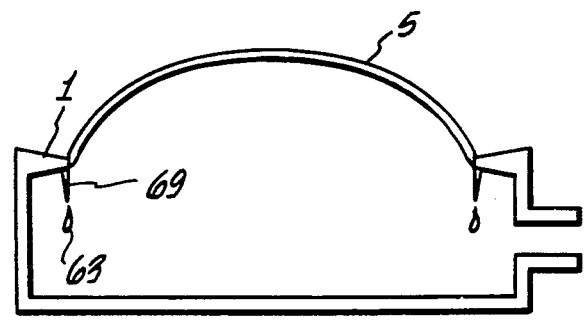

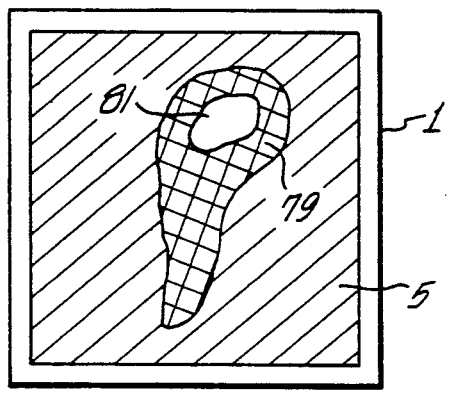
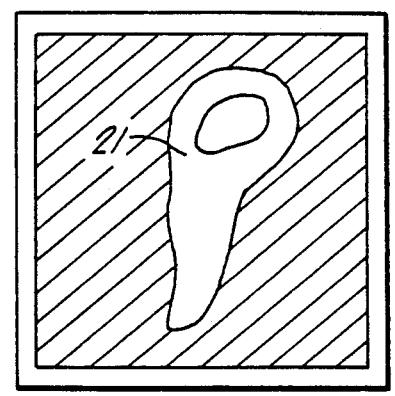
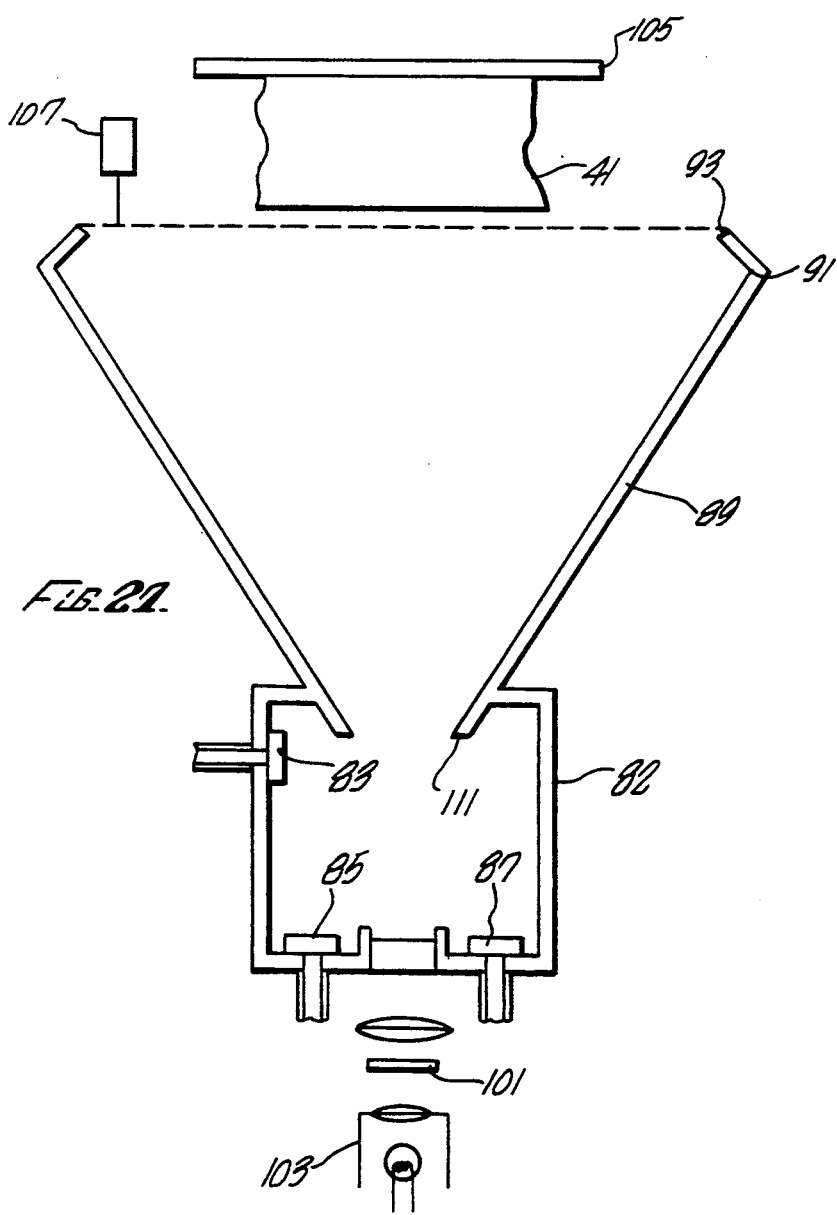

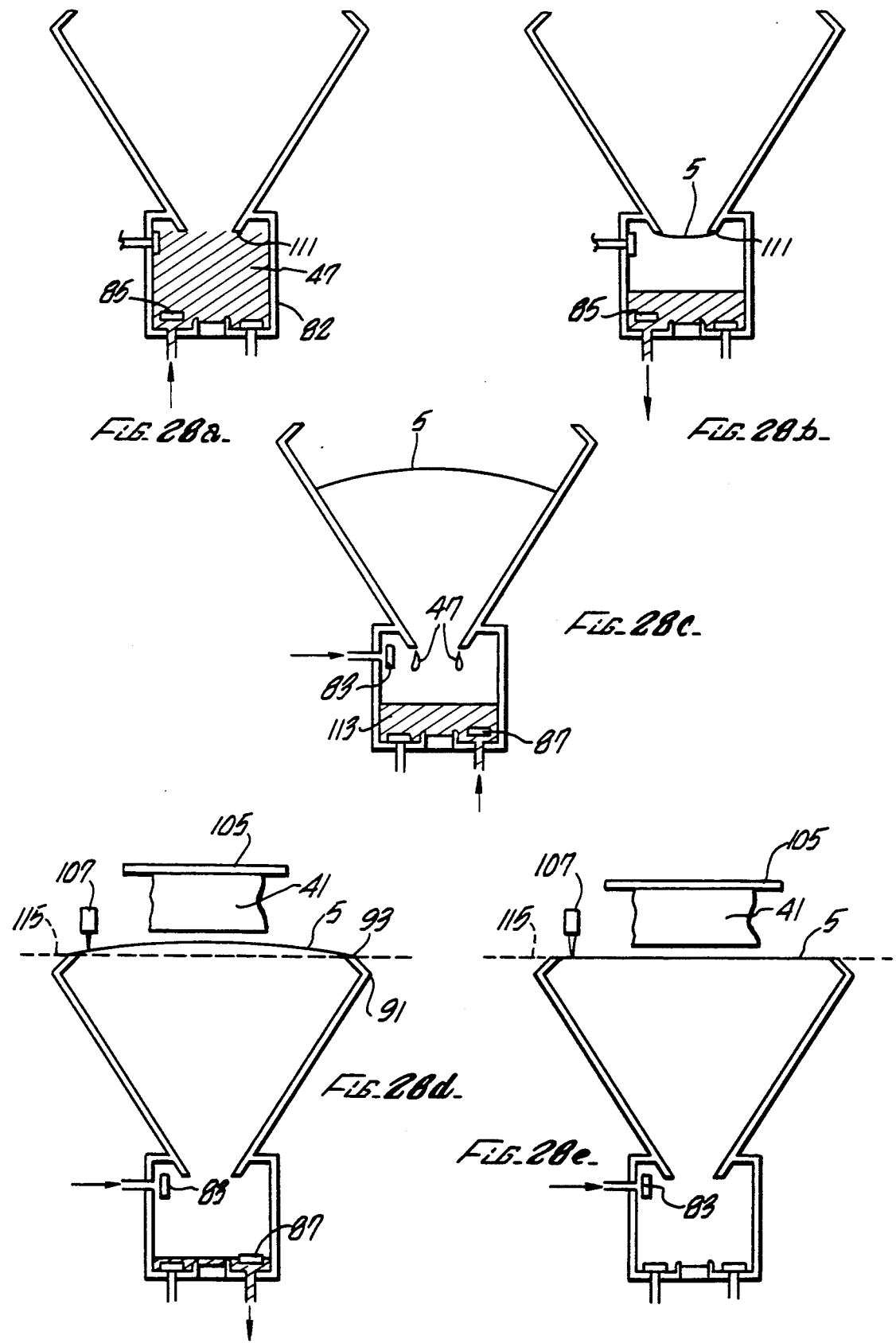

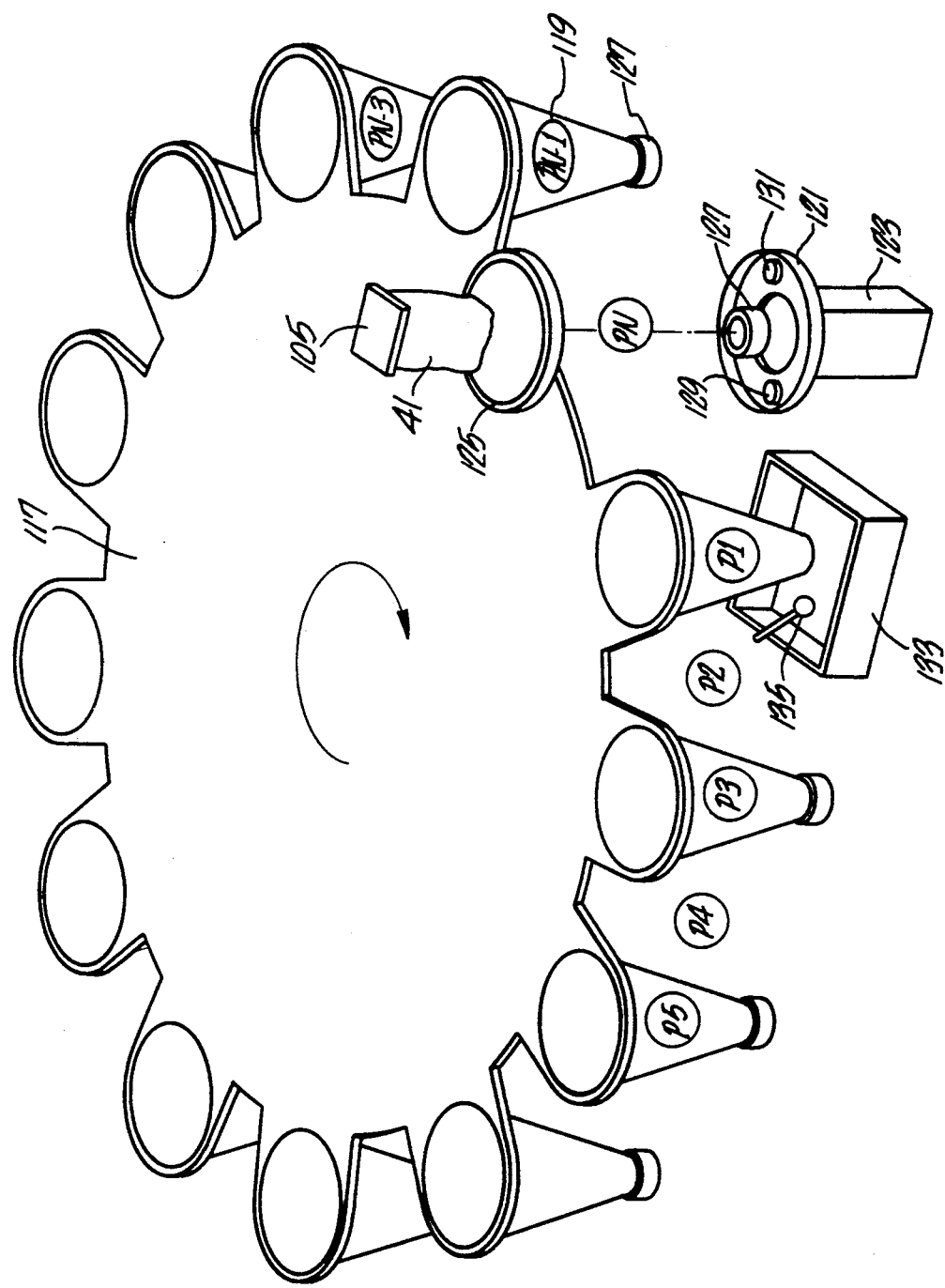

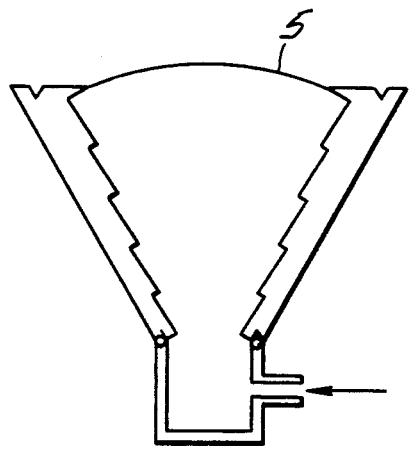
Fig. 30g.
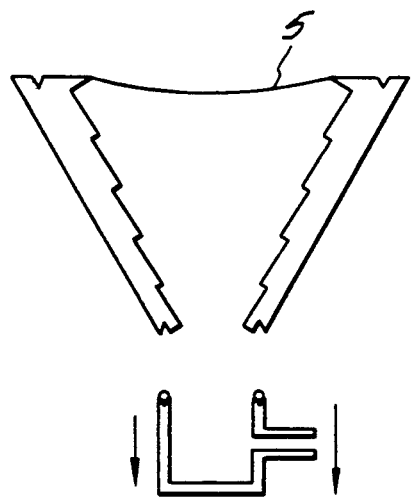
Fig. 30h.
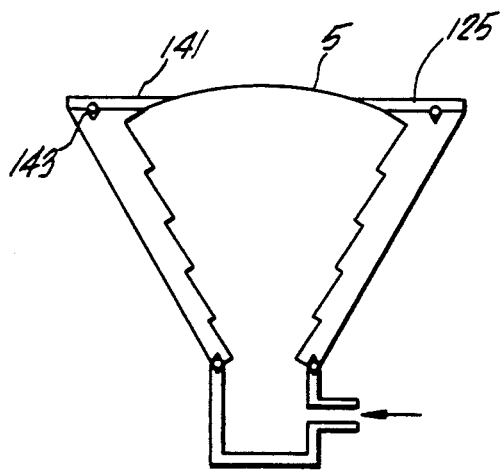
Fig. 30i.
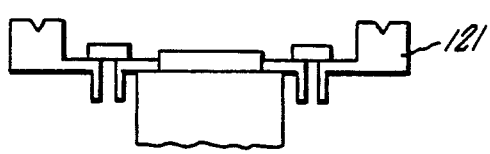
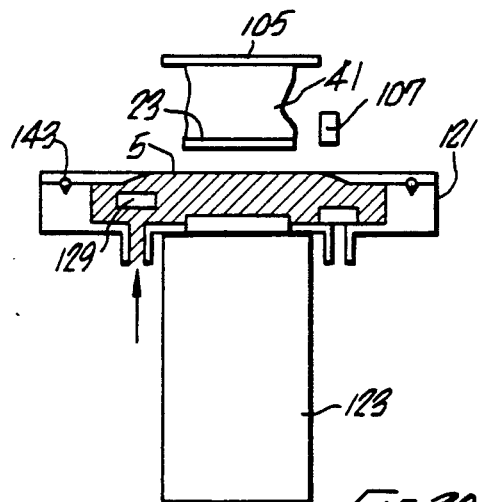
Fig. 30j.
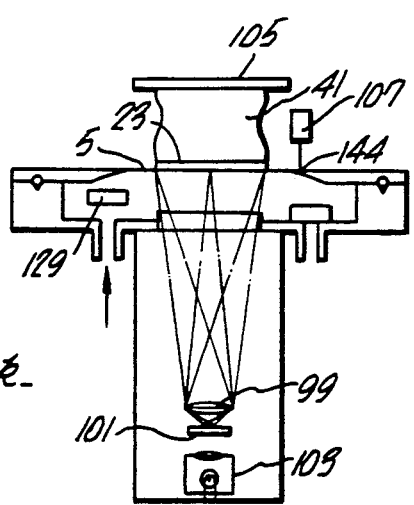
Fig. 30k.

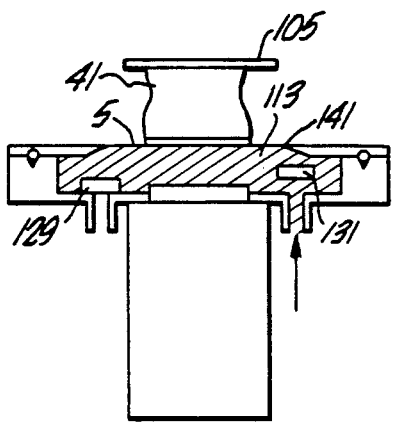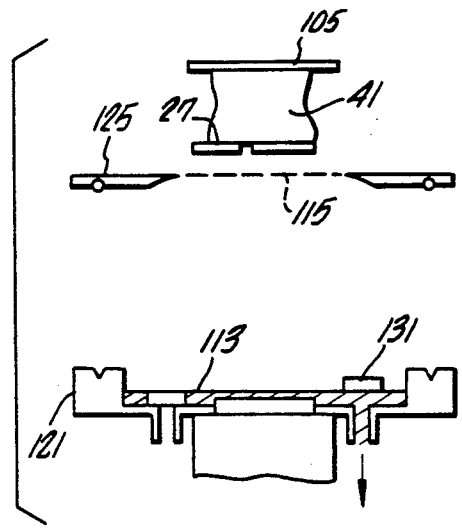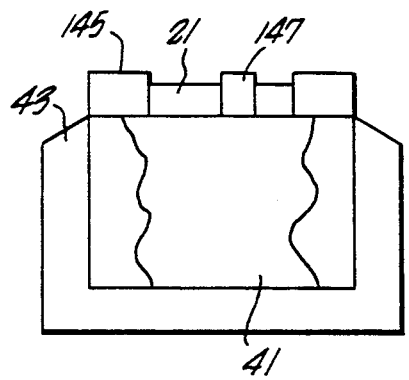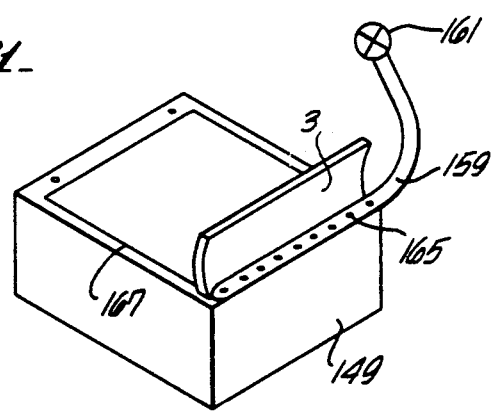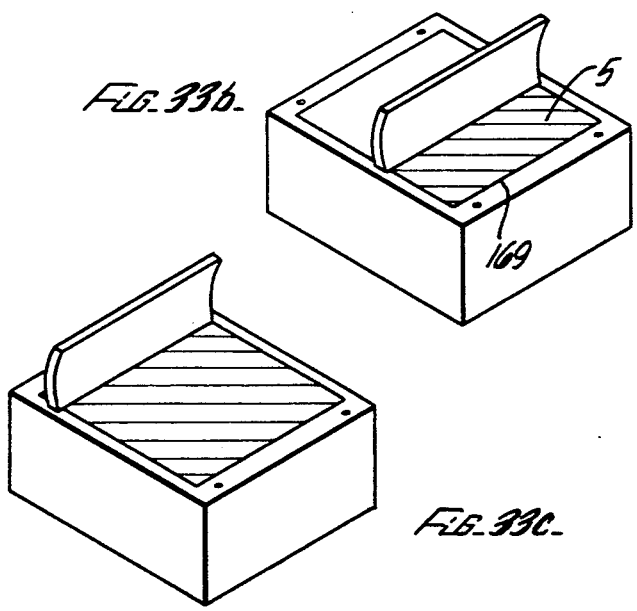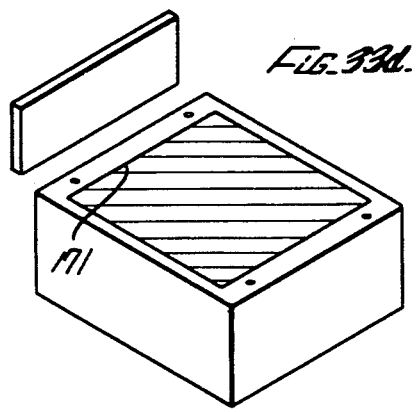

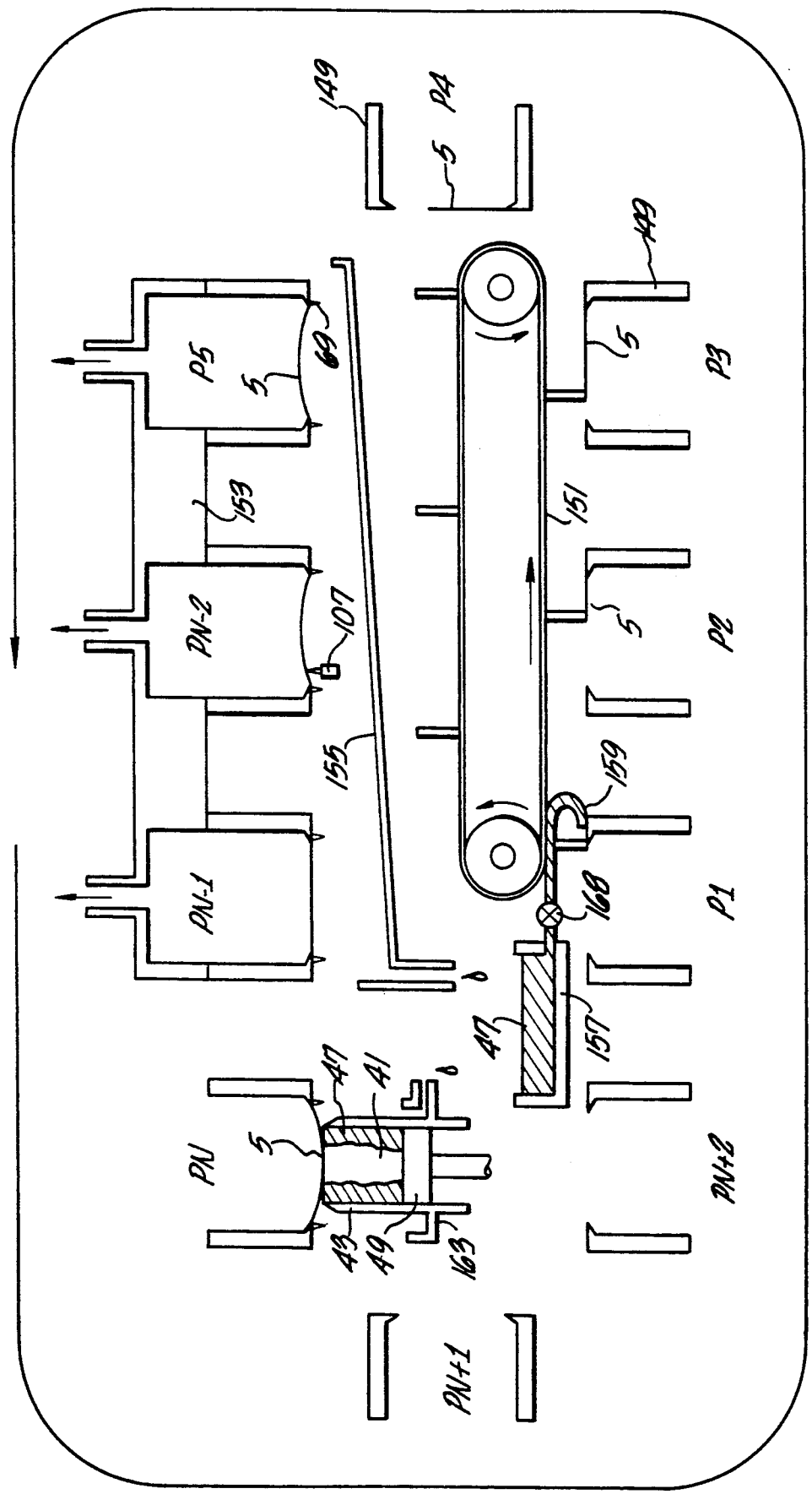

RESIN FILM RECOATING METHOD AND APPARATUS

BACKGROUND OF THE INVENTION

The field of this invention is the production of objects of material curable in response to stimulating radiation. This invention relates generally to an improved stereolithography method and system for the production of three-dimensional objects.

In recent years, "stereolithography" systems, such as those described in U.S. Pat. No. 4,575,330 entitled "Apparatus For Production of Three-Dimensional Objects By Stereolithograpy" have come into use. Basically, stereolithography is a method for automatically building complex three-dimensional objects by successively solidifying a plurality of thin layers of a solidifiable fluid-like medium by exposure to appropriate stimulation. Successive layers are solidified on top of each other until all of the thin layers are created to form a whole object (objects made in this way are sometimes called "parts"). In a preferred embodiment the fluid medium is a liquid photo-polymer that can be polymerized and solidified by exposure to UV radiation. Each polymerized layer is in essence a thin cross section of the desired three-dimensional part. This method of fabrication is extremely powerful for quickly reducing design ideas to physical form for making prototypes. Moreover, complex parts can be made quickly without tooling. Because the system uses a computer to generate the cross section of patterns, the system can be readily linked to CAD/CAM systems.

Presently preferred polymers are cured by ultraviolet (UV) light and their curing rates are fast enough using reasonably available UV light to make them practical building materials. An ultraviolet laser generates a small intense spot of UV which is moved across the liquid surface with galvanometer or servo mirror X-Y scanners in a predetermined pattern. The scanners are driven by computer generated vectors or the like. Precise complex patterns can be rapidly produced with this technique.

Stereolithography requires the formation of thin, uniformly-thick volumes of liquid resin which can be selectively hardened by exposure to synergistic radiation to form solid layers of the part being built. The prior art requires that the part be immersed in a vat of resin, and the formation of these resin volumes is accomplished by one of two methods, gravity recoating or blade recoating.

In gravity recoating, the part being fabricated is lowered below the resin surface to permit liquid to flow across the previously-formed layer. Generally the part is lowered by more than the thickness of the desired layer so as to accelerate flow of the viscous material; it is then raised to a position lower than its previous position by a distance equal to the desired layer thickness. The excess thickness of liquid above the previous layer is then higher than the general liquid surface, creating a bulge. After some time, the bulge flattens due to gravity and the liquid surface becomes more or less flat. This completes the formation of the volume called the "pre-layer"; it is bounded on one surface by a plane coincident with the top of the previous layer and on the opposite surface by the free working surface of the resin.

Blade recoating is similar to gravity recoating except that a blade, sweeping across the liquid surface, intercepts the bulge and trims its thickness to a dimension closer to the desired layer thickness. This is usually done while the previous layer is higher than the general liquid surface. The part is then lowered so that the previous layer is below the liquid surface by the desired layer thickness, and gravity provides the final flattening of the surface.

Both gravity and blade recoating suffer from the characteristic that as the bulge decreases in height, the forces which tend to flatten it decrease in magnitude. Therefore flattening can require a long time. In some circumstances, surface tension may even act in a way that creates an equilibrium surface which is non-flat.

The vertical resolution which can be obtained with stereolithography improves in proportion to the thinness of the layers which can be formed. Furthermore, according to the prior art, viscous resins are necessary to minimize distortions such as shrinkage and curl. Because the time required to obtain a flat working surface increases with the thinness of the pre-layer and the resin viscosity, thruput must be traded off against resolution and accuracy. Another problem is that the time required to obtain a flat working surface is a function of the pre-layer thickness and of the geometry of the layers already built, creating a variable which presently must be selected by the operator. If the previous layers are wide, flattening will be slower than if they are narrow. Trapped volumes (volumes of resin within part walls which do not communicate with the remainder of the resin except near the surface) also slow down the formation of the pre-layer.

A blade has been used to speed recoating but presents many problems. For example, the thickness of the pre-layer after the bulge has been trimmed by the blade is a function of the part geometry: it is somewhat affected by the width of regions of the previously-built part, and very sensitive to the presence of trapped volumes. To help compensate for the effects of geometry, it is possible to vary blade velocity, number of sweeps and clearance (distance between the previous layer and the blade) on a layer-by-layer basis. However, this creates even more variables and may not solve the fundamental problem of a variety of geometries on a single layer, not all of which can be optimally recoated at the same time. A blade tends to hollow-out trapped volumes, which can cause severe part deformity. Further problems with blade recoating which can create severe defects in parts include the formation of creases on the liquid surface (after use of the blade) and the formation of bubbles on the liquid surface. Finally, there are difficulties associated with the manufacture and alignment of a blade mechanism which must remain substantially parallel to the liquid surface throughout its motion.

With the prior art, curing takes place at the surface of a volume of resin. The pre-layer is in contact with the previous layer and with an underlying volume of resin. Normally the prelayer is given more exposure than is necessary to cure to a depth equal to the layer thickness; this is known as overcure. Overcure provides proper adhesion between the layer and the previous layer where the two are in contact. Additional overcure may be employed to strengthen the layer. Overcure has no effect on layer thickness in regions of the layer which are in contact with the previous layer. However, the extra exposure causes curing of the resin beneath the pre-layer in the remaining regions, with the result that these regions become thicker than the desired layer thickness. Thus to obtain proper adhesion and extra rigidity of the layer, the accuracy and uniformity of the layer thickness is sacrificed. Though it is possible to reduce the exposure of regions which do not contact the previous layer (since no adhesion is required in these), this complicates part building and still does not allow for extra rigidity.

With the prior art, the previous layers are immersed in resin during the entire part building cycle (this is because the bulk resin supplies the material and the support for the prelayers.) Therefore removal of excess resin cannot occur until the part is completely built. This forces the existence of an extra step in the production of the part, known as part stripping. Furthermore, liquid resin may be trapped by closed surfaces within volumes which are not intended to be solid (such it the case, for example, in trying to build a hollow sphere). To drain these regions the surface must be perforated and repaired afterwards. Finally, in some parts there are narrow passages and spaces which are filled with liquid resin; these must be cleaned out thoroughly before post-curing so that the part geometry is correct. Capillary adhesion and resin viscosity make it difficult to remove resin from these regions.

For further details of stereolithography, reference is made to U.S. Pat. No. 4,575,330 and the following pending U.S. patent applications which are incorporated herein by this reference in their entirety, including appendices attached thereto or material incorporated therein by reference, as if fully set forth herein:

U.S. patent application Ser. No. 339,246, filed Apr. 17, 1989, entitled "STEREOLITHOGRAPHIC CURL REDUCTION";

U.S. patent application Ser. No. 331,644, filed Mar. 31, 1989, entitled "METHOD AND APPARATUS FOR PRODUCTION OF HIGH RESOLUTION THREE-DIMENSIONAL OBJECTS BY STEREOLITHOGRAPHY";

U.S. patent application Ser. No. 183,015 now issued as U.S. Pat. No. 5,015,425, filed Apr. 18, 1988, entitled "METHOD AND APPARATUS FOR PRODUCTION OF THREE-DIMENSIONAL OBJECTS BY STEREOLITHOGRAPHY";

U.S. patent application Ser. No. 268,429, filed Nov. 8, 1988, entitled "METHOD FOR CURING PARTIALLY POLYMERIZED PARTS";

U.S. patent application Ser. No. 268,428, now abandoned, filed Nov. 8, 1988, entitled "METHOD FOR FINISHING PARTIALLY POLYMERIZED PARTS";

U.S. patent application Ser. No. 268,408, filed Nov. 8, 1988, entitled "METHOD FOR DRAINING PARTIALLY POLYMERIZED PARTS";

U.S patent application Ser. No. 268,816, filed Nov. 8, 1988, entitled "APPARATUS AND METHOD FOR PROFILING A BEAM";

U.S. patent application Ser. No. 268,907, filed Nov. 8, 1988, entitled "APPARATUS AND METHOD FOR CORRECTING FOR DRIFT IN PRODUCTION OF OBJECTS BY STEREOLITHOGRAPHY";

U.S. patent application Ser. No. 268,837, filed Nov. 8, 1988, entitled "APPARATUS AND METHOD FOR CALIBRATING AND NORMALIZING A STEREOLITHOGRAPHIC APPARATUS";

U.S. patent application Ser. No. 249,399, filed Sept. 26, 1988, entitled "METHOD AND APPARATUS FOR PRODUCTION OF THREE-DIMENSIONAL OBJECTS BY STEREOLITHOGRAPHY";

U.S. patent application Ser. No. 365,444, filed June 12, 1989, entitled "INTEGRATED STEREOLITHOGRAPHY"; and U.S. patent application Ser. No. 265,039, now abandoned, filed Oct. 31, 1988, entitled "APPARATUS AND METHOD FOR MEASURING AND CONTROLLING THE LEVEL OF A FLUID".

U.S. patent application Ser. No. 269,801, now abandoned, filed Mar. 31, 1989, entitled "METHOD AND APPARATUS FOR PRODUCTION OF HIGH RESOLUTION THREE DIMENSIONAL OBJECTS BY STEREOLITHOGRAPHY".

SUMMARY OF THE INVENTION

The present invention comprises a system for quickly forming thin, pre-layers of uniform thickness with no dependence on part geometry. A stereolithography system incorporating this method has a number of important advantages over the prior art.

Rather than forming pre-layers by causing resin from a reservoir in which the part is immersed to flow over the previous layer, the invention forms pre-layers separately without initial contact with the part, then incorporates them into it. These pre-layers are thin films of resin which are supported at their edges by a rigid structure, and exist because of the surface tension of the liquid. The process described by the invention is termed resin film recoating (RFR). RFR results in very high resolution stereolithography because layers made of such films can be made very thin.

It is observed that if a wire ring of small enough area is dipped in water containing a small amount of soap, a thin film of soap will span the ring when it is withdrawn. Present stereolithography resins also exhibit this property, and the thickness of the resulting films are of the same order as those made with soap solution: on the order of microns.

The basic principles of the invention are as follows: A film of resin is applied to a rigid, flat support frame by dipping or other means. The frame is then transported so that the film makes contact with the surface of a part-building platform (or the surface of a support structure affixed to it) so as to create a working surface at a pre-determined distance from the imaging optics; this is termed the working plane. The film is then selectively exposed to synergistic radiation and hardens to form the first layer of the part. Synergistic stimulation means irradiation with ultraviolet light (UV), electron beams, visible light, invisible light, or X-rays. In the manner known to the prior art, this layer adheres to the platform or support structure. The frame and the unhardened resin are then removed and the platform and layer are translated away from the working plane by an amount equal to the thickness of the next layer to be formed. A film is applied again to the support frame and the frame is moved until the film makes contact with the first layer to create a new working surface at the working plane. The film is then selectively exposed to form the second layer, which adheres to the first where the two are in contact. The frame and the unhardened resin are then removed and the platform and part-in-progress are translated away from the working plane as before and the above process repeats until all layers have been formed and the part is complete.

With RFR the layer thickness is generally defined by and limited to the pre-layer (i.e., the film) thickness. The degree to which the film is cured can then be controlled independently and the only constraint is that adequate exposure must be provided to ensure not only hardening of the entire pre-layer thickness but also adhesion to the previous layer. With a fixed maximum layer thickness, differences in exposure no longer influence the geometry of the finished part: the layer thickness accuracy is controlled by the film thickness accuracy alone. With RFR, not only can layers be made more rigid and less vulnerable to curl, sag and other distortions, but they can be fully cured by a laser, thus eliminating the need for post curing.

Since layer thickness is limited by film thickness, there is a saturation exposure of the film beyond which no further curing occurs. Several advantages are gained by using the saturation exposure as the minimum exposure.

Variation in drawing speed at the working surface (raster or vector exposure) has no effect on part accuracy. Raster exposure is the process of constructing an image on a surface by scanning a spot of variable intensity across it to create a set of parallel lines as used in television, for example. Thus velocity regulation of the scanning system is less critical. Furthermore, the speed at which a spot of radiation moves across the working surface varies with the angle of incidence from a central rotating mirror. By arranging that the maximum speed provides the saturation exposure, no effect will be seen due to speed variation.

In the case of vector exposure, when the moving spot of radiation traces a contour, the accelerations associated with changing direction can be minimized and the contour accuracy increased by simply reducing the drawing speed. Indeed, the spot can come to a dead stop, for example, at a sharp corner, if faster movement would cause it to deviate from the desired path.

If something interrupts the process of part building during exposure of the layer, it is a simple matter to re-start the part without causing distortion. There is no need to track how much the layer has been exposed prior to the interruption, because a full repeat exposure can be given without any change in the layer dimensions.

In the case of vector exposure, with the prior art there are many points or lines on a given layer where vectors are superimposed and therefore where the total exposure is greater than in non-superimposed areas. The result is greater depth and width of cure. In the present invention, by exposing each vector to the point of saturation, the superimposed regions are no different than the others.

If the intensity of the radiation source changes during part building (as is typical of laser sources), as long as the minimum intensity provides the saturation exposure, there will be no effect on part accuracy.

In the present invention it is possible to avoid having resin surround the previous layers. Thus, after each layer is exposed, the unhardened resin is stripped away, either by solvents, vacuum or mechanical action. Having done this, it is possible to post cure the layer, if not fully cured, before proceeding with the next layer. Thus RFR allows integration of stripping into part building and integration or elimination of post-curing. Because all the excess resin is confined to a two-dimensional region, it can be removed very thoroughly. If post-curring is required, it may be done to the two-dimensional layer; thus it is very easy to achieve fast and uniform exposure, reducing post cure distortion due to differential cure. Furthermore, post curing during the build process means that the entire part is not in the green state of low strength, and is much less subject to distortions, such as curl.

Very thin layers can be created quickly, unlike the prior art where a thick layer is formed initially and must be reduced in thickness by gravity and/or blade.

Very uniform layers can be created quickly, since surface tension acting on both of the surfaces of the film tends to cause them to be flat (to have minimum surface area).

With prior methods of recoating, the material used to form each new layer comes from the vat of resin surrounding the previous layers and the pre-layers are in direct contact with this volume of resin. In the present invention, however, the material for new pre-layers is obtained from a separate reservoir and is touched only by the previous layer of the part. Thus it is possible for each layer of the part to be formed from a different material. The present invention makes it possible to use multiple materials on a single layer. Several exposures may be made on a single layer such that the final layer is formed from a group of panels joined along their edges. By extending this concept, it is possible to apply an entire pre-layer of one material but only expose it partially, then strip the unexposed liquid and apply another pre-layer of a different material. The remainder of the layer pattern is then exposed; the concept can be extended to any number of materials and exposures. In this way, stereolithography becomes a tool for manufacturing not just "parts," but finished assemblies, without the need for assembly. Each "assembly" consists of "components" with the required properties (hardness, color, transparency, conductivity, flexibility, and so forth) and no glue or other fasteners are required due to the adhesive property of the resins.

The thinness of resin films can be used to advantage to create parts built of composite materials. In this scenario, a film of material A is applied and the layer exposed. A film of material B is applied after stripping the residue of material A and then exposed to the same pattern. Further exposures may introduce other materials or repeat previous materials. The result is a part in which each layer is made from a composite material having itself several layers.

Leveling of the SLA is less critical in the present invention. With the prior art, the layer is formed at the free surface of a volume of liquid. This surface will always be horizontal and thus to avoid misregistration of the layers, it is essential to vertically align the axis along which an elevator platform travels (the Z-axis). With the present invention, however, a layer can be formed in a supported film which lies in a plane defined by its support frame. If this frame is pre-aligned to the Z-axis, the machine may not need to be leveled as carefully as with the prior art (note however that compensation for gravitation sag may constrain how much the machine can be off-level. Relaxing the accuracy of leveling makes a portable or desk top stereolithography apparatus more viable.

With RFR, the thickness and accuracy of the pre-layer, and therefore of the layer, is not affected by the geometry of any previous layer, thus eliminating the need to control extra part-building variables and allowing varied geometries to be accommodated.

With RFR, the pre-layers are formed separately from the part. Therefore while one pre-layer is being exposed, the second pre-layer can be formed and readied for exposure; this parallel processing can increase the thruput of part building.

Geometric distortion and focal blur due to a central rotating mirror can be minimized with RFR by using pre-layers which are not flat, but which approximate a spherical surface.

An elevator platform need not be perforated as with the prior art, since there is no need for resin to flow through it. Thus, the platform is less expensive to manufacture. Moreover, if it can be easily separated later, surfaces of the part may contact the platform directly, without the need to be spaced by supports. This improves thruput and allows the smooth platform to impart its finish to these part surfaces.

BRIEF DESCRIPTION OF THE DRAWINGS

FIG. 1 is a block diagram of resin film recoating.

FIG. 2 is a drawing of an apparatus for forming a film.

FIG. 3a and FIG. 3b are sequential cross-sectional drawings of a funnel for creating or enlarging a film.

FIG. 4a and 4b are sequential elevational drawings of an apparatus for forming and enlarging a film.

FIG. 5 is an elevational drawing of an alternate apparatus for forming and enlarging a film.

FIG. 6a is a perspective drawing of an apparatus for forming a film in sections.

FIG. 6b is an inverted cross-sectional drawing cut along lines 6b—6b in FIG. 6a, including a blow-up of a portion of the cross section.

FIG. 6c is an expanded view of FIG. 6b showing the masking effect of the blades belonging to the apparatus of FIG. 6a during exposure of a layer.

FIG. 7 is a perspective drawing of a thin film formed with channels.

FIG. 8a, FIG. 8b, FIG. 8c, FIG. 8d, and FIG. 8e are sequential cross-sectional drawings of a system for curing a film.

FIG. 9a and FIG. 9b are sequential cross-sectional drawings of a system for creating a thick film.

FIG. 10 is a cross-sectional drawing of a film sagging due to gravity.

FIG. 20 is a cross-sectional drawing of a system for forming an object out of layers of sagging films.

FIG. 21 is a cross-sectional drawing of a system for stripping uncured resin.

FIG. 22 is a perspective drawing of a film with a border guard area.

FIG. 23 is a cross-sectional view of a tilted film.

FIG. 24 is a cross-sectional view of a system for adjusting the thickness of a film.

FIG. 25 shows a prior art curing pattern.

FIG. 26a is a cross-sectional view of a film using the cross-hatching pattern of FIG. 25.

FIG. 26b is a cross-sectional view similar to FIG. 26a, illustrating complete curing.

FIG. 27 illustrates the first preferred embodiment for forming an object with thin resin films.

FIG. 28a, FIG. 28b, FIG. 28c, FIG. 28d, FIG. 28e, FIG. 28f, FIG. 28g, FIG. 28h, and FIG. 28i are sequential cross-sectional drawings illustrating the function of the system in FIG. 27.

FIG. 29 is a perspective drawing of the second (and most) preferred embodiment for forming an object by selectively curing successive films.

FIG. 30a, FIG. 30b, FIG. 30c, FIG. 30d, FIG. 30e, FIG. 30f, FIG. 30g, FIG. 30h, FIG. 30i, FIG. 30j, FIG. 30k, FIG. 30l, and FIG. 30m are sequential cross-sectional drawings of a layer being added to an object being formed by the system shown in FIG. 29.

FIG. 31 is a cross-sectional view of a partially cured layer.

FIG. 32 is a cross-sectional drawing of the third preferred embodiment of forming an object by selectively curing successive films.

FIG. 33a, FIG. 33b, FIG. 33c, FIG. 33d, FIG. 33e, FIG. 33f, FIG. 33g, FIG. 33h, FIG. 33i, and FIG. 33j are sequential drawings showing a layer being formed with the system shown in FIG. 32.

DETAILED DESCRIPTION OF THE PREFERRED EMBODIMENT

Resin Film Recoating

Figure 12:
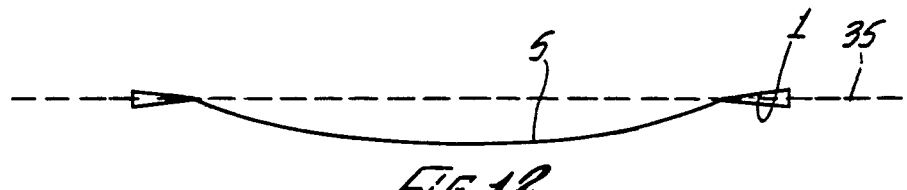
FIG. 12 is a cross-sectional view of a system for curing a film of resin submerged in inert material.

FIG. 1 is a block diagram of the general system employed by the present invention. Initially, an apparatus is used to create a thin film of stereolithographic resin separately from an object ("part") being formed by stereolithography. Next, an apparatus is used to apply the created film to the part. Then, stimulating radiation is applied to selectively cure the film in a pattern. Finally, means are employed to remove uncured film from the object.

A number of difficulties are overcome by the embodiments of the invention. These difficulties are discussed below as an introduction to resin film recoating (RFR):

A first difficulty is separate formation of a resin film with an area large enough to cover a typical layer of a part being built. As the area spanned by a support frame increases, it becomes more and more difficult to form large films by dipping the frame in resin and withdrawing it. The film must provide a working surface which is as large as the largest layer that must be formed (call this the working area). For parts of the size typically built with the prior art (up to 10 inches per side or up to 20 inches per side), there is a preferred solution and an alternate solution.

The preferred solution is creating a small film and then stretching it. This can be done in the following ways. FIG. 2 illustrates a first way, making a rectangular frame 1, one side of which is moveable, or pulling a device such as a squeegee 3 across the frame. The film 5 is created by applying resin between the moving element and the opposite fixed side of the frame, and then slowly separating the two until the film has been stretched to its maximum area. A second way of creating a small film and then stretching it is by dipping the frame vertically or at a steep angle into a container of resin and then withdrawing it; in this case, the surface tension of the resin left in the container acts somewhat like the squeegee described above. A third way is by creating a small film 5 (say, by dipping) at the narrow end of a tapered, funnel-like structure 7 (FIG. 3a) and forcing the film towards the wider end by a difference in air pressure (FIG. 3b). A fourth way is by creating a small film on a frame which can expand somewhat uniformly. The frame can be made of several rigid strips 9 which slide over one another (FIG. 4a) as the film 5 expands until the maximum size is reached (FIG. 4b), at which point the ends meet and all the strips lie on the same plane. Alternately, the frame 11 can be made of an elastic material like rubber which is put under tension and stretched to cover a much larger area (FIG. 5).

An alternate solution to the difficulty of creating large films is avoiding the need for large films by breaking up the working area into several working surfaces, each consisting of an individually-supported film. The frame can be broken up into a series of smaller subframes. For example, the frame 13 can be spanned by a number of blades 15 (FIG. 6a). When the frame is dipped in resin, the result is a series of adjacent films 5 meeting at the blade edges (FIG. 6b). Because the film thickness is rot uniform in the vicinity of the blade edges and because exposure of the film adjacent to the edges would cause adhesion of cured resin to them, narrow regions 17 (FIG. 6c) of the working area centered on the edges must not be exposed. The thick ends of the blade act as masks to only allow exposure to radiation 19 of areas 21 separated from the blade edges (note that if radiation intercepting the working surface at various angles is used, the blades should not be parallel to each but rather to the local incident ray). This creates channels 25 (FIG. 7) running through the layer 27 where no resin has been hardened. If small, these channels are tolerable, and may even be beneficial, acting as strain-relieving "smalleys." A smalley is a small gap or hole which takes up stress. The blade edges should have the minimum radius possible. In some cases, the splitting of the layer by the channels will produce sections of the layer which have no contact with the previous layer 23 and are therefore unsupported and unattached. A properly-positioned part support (not shown), known to the prior art, can prevent this occurrence. To avoid separating the final part into several pieces, the channels 25 in adjacent layers must not be aligned. If parallel on adjacent layers, they should be offset randomly; better still are channels which are not parallel but are rotated through an angle which changes from layer to layer (this angle could be selected so as to minimize the number of unsupported regions created by the channels). Because the films may be slightly withdrawn [above the bottom of the blades 15] edges, it may be necessary that the blades be spaced widely enough to permit some sagging of the film between them which will permit contact between the previous layer 23 and the exposed regions 21. A stream of air applied briefly against the films from the top in FIG. 6c can also help to facilitate this contact by positioning films 5 at the proper height. When new layer 21 does not fully overlap old layer 23, the sagging of the film outside the area of overlap can be counteracted by differential air pressure.

The channels 25 described above can be avoided by a modification in which the spacing of the blades is changed and shadowing strips 29 are added, as shown in FIG. 8a. Here, for each layer, there are several (in this example, two) applications of the frame and films are applied to the previous layer twice and exposed twice. First, films are applied to the blades and the frame is positioned over the working area as in FIG. 8b. An exposure is made, and channels 25 are created due to the shadowing strips of the same width (assuming collimated radiation) as the exposed resin 21 between them (FIG. 8c). After the unexposed resin is stripped away, films are again applied and the blades are positioned as in FIG. 8d, now shifted by a precision linear translator by a channel width with respect to its previous position. A second exposure is then made, which hardens the resin within the channels. The unexposed resin is removed once more. If done accurately, the result is a continuous layer comprised of adjacent panels and no channels in the finished part. It is important to avoid overlap of the two exposures to avoid increasing the thickness the joint between the panels. However, because of the distortion of the film caused by the hardened panels of the first exposure, it may be very difficult to avoid small irregularities in layer thickness 31 at the joints. To disperse these irregularities over the entire part and prevent a localized accumulation which could effect the final part dimensions, the location of the joints in the working plane should be staggered from layer to layer.

A second difficulty overcome by the present invention is evaporation of resin constituents. With the resin-filled vat of the prior art, evaporation of volatile components from the free surface has not appeared as a problem. There is only one surface exposed to the air, and if the concentration of certain components is decreased near the surface by evaporation, it can be compensated for by diffusion from the bulk liquid, driven by the concentration gradient. With RFR however, there are two exposed surfaces and no bulk liquid to compensate for evaporation. As evaporation progresses, the properties of the resin may change. Furthermore, the thickness of the film will not be constant and the film may become unstable and disintegrate.

One solution to the second difficulty is reducing the number and concentration of volatile components within the resin. Resins used in the present art have very few volatile components and use these in very low concentration, so evaporation is not presently a problem.

Another solution to the second difficulty is increasing the concentration of unavoidable volatile components, to allow for some evaporation. In this case, the formulation of the resin will be a function of time and it is important to harden the resin over a very short period. Thus flash exposure (in which the entire cross section is exposed simultaneously to synergistic radiation, typically by projecting the image of a mask with synergistic radiation onto the surface (the mask consists of regions which are substantially transparent and others which are substantially opaque to the radiation) is preferred over vector or raster scanning exposure, which exposes the surface a little at a time and is generally slower. Flash exposure is also desirable because if the resin thickness changes with time, hardening of the entire layer can be made to occur at a specified thickness. It may be difficult, however, to achieve the desired resin formulation and film thickness at the same moment in time because the surface tension force responsible for thinning has little relationship to the evaporation of volatile components.

Another employable solution to the second difficulty is providing a high concentration of the resin volatiles in the air surrounding the resin film. By purposely evaporating these components from an abundant source, such as a heated vat of resin, the net rate of evaporation from the film can be significantly reduced.

A third difficulty facing RFR is surface tension. A low surface-tension resin is required in order to easily generate a film. The preferred solution of the present invention is to add surfactants to the formulation if the surface tension in a particular resin is found to be too high. Note however that this exacerbates the problem of gravitational sag discussed below.

A fourth difficulty is optical interference of synergistic radiation. With the resin-filled vat of the prior art, the depth of the resin, even above the previous layer, is much greater than the wavelength of the typical ultraviolet synergistic radiation. Furthermore, the radiation is greatly reduced in intensity by absorption and scattering before it can be reflected in the direction from which it came. For both these reasons, optical interference of the radiation within a vat of resin does not occur. However, with RFR, very thin films can be utilized having a thickness comparable to the synergistic radiation wavelength. Therefore, modulation of the intensity of the radiation within the film (and therefore of the exposure) can occur due to optical interference effects. These effects will be related to the refractive index of the resin, the film thickness, the angle of incidence of the radiation and whether the film is in contact with the previous layer or with air on the side facing away from the source of radiation. A first solution to the optical interference difficulty is generating films which are significantly thicker than the wavelength of synergistic radiation used. A second solution is reducing the wavelength of the synergistic radiation. A third solution is using broad-spectrum synergistic radiation and a resin with a broad spectral sensitivity so that constructive interference of certain wavelengths are adequately compensated by destructive interference of others. A fourth solution is using incoherent synergistic radiation so that interference effects are less pronounced. A fifth solution is allowing for variation in intensity by ensuring that the minimum exposure that will be obtained provides complete curing of the resin (i.e., minimum exposure equals the saturation exposure). This can be accomplished because it is possible to completely cure the resin in a resin film with no increase in layer thickness, unlike the prior art. However, it is necessary to avoid excessive power transmission to the film or it may disintegrate.

A fifth difficulty overcome by the present invention is overly-thin layers. The prior art provides thin layers only with difficulty, and layers thinner than 0.005" have rarely been attempted. A desirable goal for stereolithography is 0.0005–0.005" layers for high resolution. RFR can create layers with thicknesses comparable to a wavelength of visible light (e.g., 0.00002"); layers this thin present some problems. First, even if fully cured, lines of this thickness are very fragile. If drawn without adequate support, they may sag or collapse under their own weight and may not survive the process of stripping away uncured resin. Curl also tends to be more severe with thin layers because the layer stiffness is less, allowing the bending force to induce curvature in the layer. Secondly, tens of thousands of layers are required to build up a single inch of part height; unless these layers can be formed and exposed at a very high speed, this will significantly reduce the thruput of the machine for parts of the size typically built with the prior art (but see the fourth preferred Embodiment below). The present invention overcomes the fifth difficulty as follows: Overly-thin layers can be prevented by formulating the resin to yield thicker films. Overly-thin films can be increased by condensing resin vapor onto the film prior to exposure. Overly-thin films can be combined on several frames surface-to-surface prior to exposure (FIG. 9a), so that they merge into a thicker film 33 (FIG. 9b). The frames are of different sizes so that they can nest sufficiently to allow contact between the films (which typically are thinner than the edge of the frame). Because the thicker film will likely be unstable and attempt to become thinner, it may be necessary to prepare as many films as need to be combined, merge them simultaneously and immediately form the layer with a flash exposure, before thinning can occur. Note that if the approach in section 6.3 is used, films can be stacked and the result is a stable pre-layer.

A sixth difficulty overcome by the present invention is achieving layer flatness. With the prior art, the working surface is the free liquid surface of a vat of resin, which has a radius of curvature similar to that of the earth: i.e, gravity makes it substantially flat. With RFR, gravity works against the process, causing the film to sag within the support frame (FIG. 10). If the force of gravity can be compensated, it suffices only to ensure that the edge(s) of the frame to which the film is attached lie(s) entirely within a plane 35. Then the film will lie in the same plane, as this produces the minimal surface area. The present invention provides at least eleven solutions to the sixth difficulty.

Figure 11:
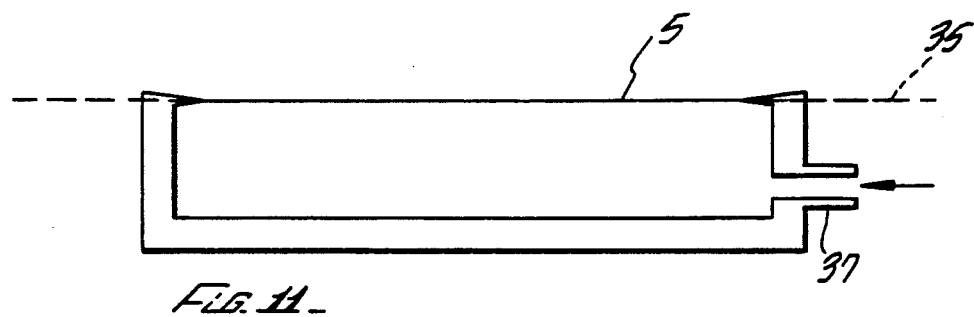
FIG. 11 is a cross-sectional drawing from a similar view as FIG. 10, with a film in an apparatus for eliminating sag.
Figure 12:
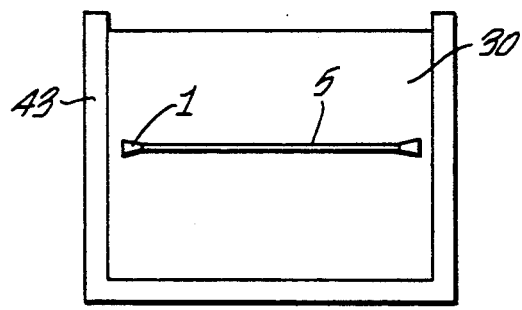

A first solution to achieving layer flatness is orienting the frame horizontally, and compensating for gravity by increasing the air pressure beneath the film relative to that above it. In FIG. 11, this is accomplished by fitting the frame to an airtight box or making the frame part of this box which can be pressurized by air entering through an inlet 37. The box may be substantially transparent to the synergistic radiation to allow exposure through its floor.

A second solution for achieving flat layers is orienting the film horizontally, and compensating for gravity by spinning it to generate centrifugal forces.

A third solution is immersing the film within an inert liquid 30 of equal density with which it is immiscible, and which is substantially transparent to the synergistic radiation (the film may need to be formed while immersed in the liquid). In FIG. 12, the previous layers of the part 41 are immersed in a vat 43 of inert liquid and the film is laid across the last layer for exposure from above. The preferred inert liquid 30 is saline with a carefully adjusted salt concentration or fluorocarbon, or a mixture of organic liquids of various densities.

Figure 13:
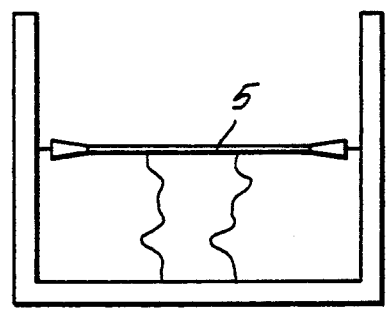
FIG. 13 is a cross-sectional view similar to FIG. 12, showing a system for curing a film resting on inert material.

A fourth solution is orienting the frame horizontally, but laying it on the surface of an inert liquid 45 of greater density which it is immiscible, and which is maintained flush with the top of the previous layer (FIG. 13). The preferred inert liquid 45 is a hydrocarbon such as freon, a fluorocarbon, or a saline solution.

Figure 14A:
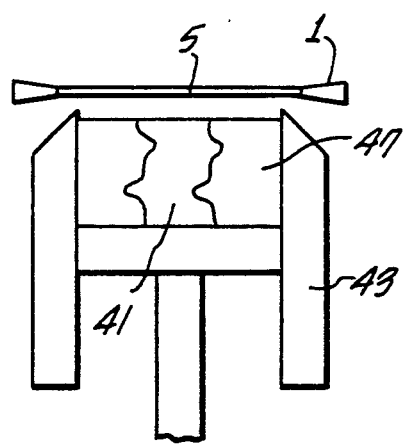
FIG. 14a and FIG. 14b are sequential cross-sectional drawings of a system for curing a film applied to a reservoir of resin.
Figure 14B:
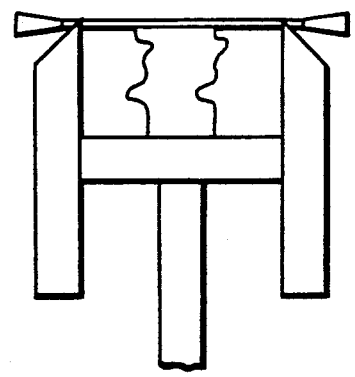

A fifth solution is orienting the frame horizontally (FIG. 14a), but laying it on the surface (FIG. 14b) of a volume of resin 47 which bathes the previous layers, and which is kept flush with the top of the previous layer by a piston 49. The upper edges of the vat are sharpened to allow the film outside the working area to be separated and flow away when the frame is removed.

Figure 15:
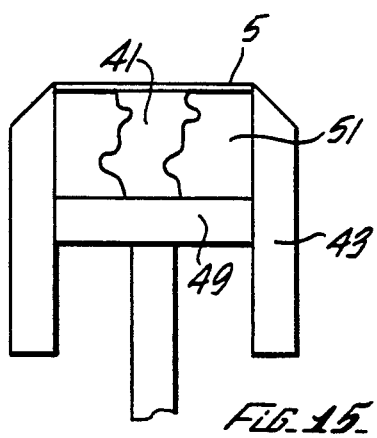
FIG. 15 is a cross-sectional view of a system for preparing a film for curing while resting on a solidified liquid material.

A sixth solution to achieving flat layers as illustrated in FIG. 15 is orienting the frame horizontally, but laying it on the surface of a solidified liquid material 51, such as wax, in which the previously-formed layers have been imbedded. After each layer is formed and the excess resin stripped away, new material is added to fill the volume not occupied by hardened resin, so that the surface of the material is flush with the top of the layer.

Figure 16:
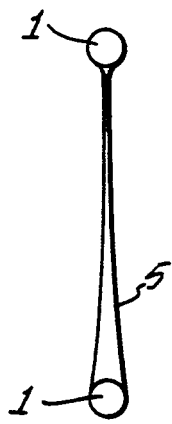
FIG. 16 is a cross-sectional drawing of a film formed vertically.
Figure 17:
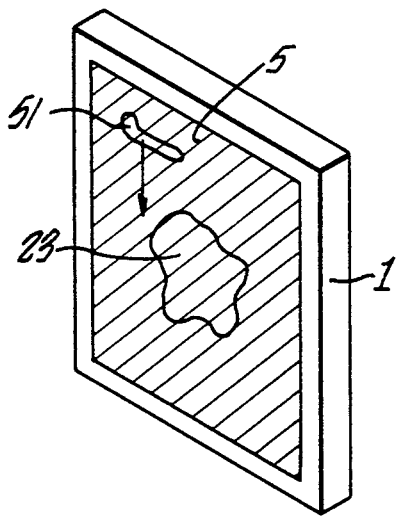
FIG. 17 is a perspective view of a vertical film being selectively cured.
Figure 18:
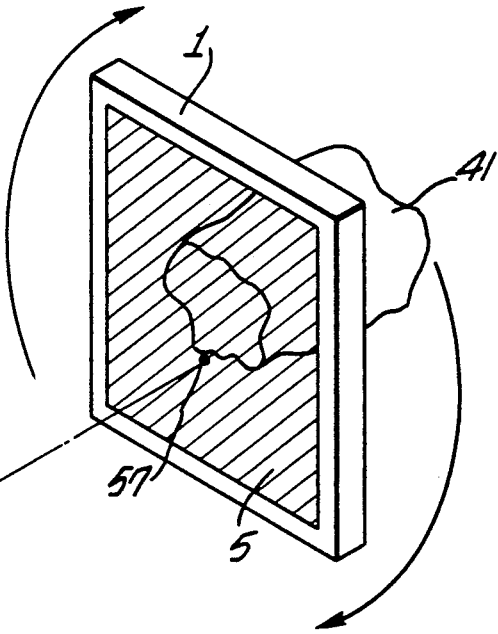
FIG. 18 is a perspective view of a system for curing a vertical rotating film.

A seventh solution is orienting the film vertically; here the problems are not sag, but variation in thickness due to resin flowing from the upper portion of the film to the lower portion (FIG. 16), as well as movement of cured but not-yet-attached regions 51 of the film, which may have different density than the unexposed resin (FIG. 17). These effects are minimized by continuously rotating a support frame or by using quick flash radiation. The support frame can be continuously rotated in its own plane, so that the pressure gradient within the film is changing fast enough to prevent substantial flow of the viscous liquid (FIG. 18). This requires that the previous layers and layer exposure pattern are rotated synchronously with the film. The latter can be accomplished optically by a mirror or prism system, or—in the case of vector exposure by dynamic mirrors 53—by mathematically introducing an angular time dependence to the signal sent to the mirror actuators 55 which moves the focused spot 57 of radiation. Using flash exposure to cure the film before it has had time to flow substantially would also eliminate the concern about moving regions of cured resin, since every layer must be in contact with the previous one somewhere and therefore be attached to it. If any flow does occur, the variation in pre-layer thickness might be compensated for by rotating the part in the vertical plane between layers, to distribute the thickness variation and prevent it from accumulating on one side of the part. The problems found with vertical orientation (and to some extent with horizontal orientation) of the film can be reduced by increasing the resin viscosity. This can be done by formulating for higher viscosity. This can be done by using higher molecular weight monomers or oligomers. Resin viscosity may also be increased by flash-exposing the film with low-intensity radiation, enough to increase the viscosity slightly but not so much that resin which is not part of the layer cannot be stripped away. Resin viscosity may also be increased by reducing the film temperature, perhaps to the extent of solidifying the film by freezing.

An eighth solution to achieving flat layers is to divide the film into smaller regions, as described above, so that the maximum amount of sag is limited because of the smaller area spanned by the film.

Figure 19:
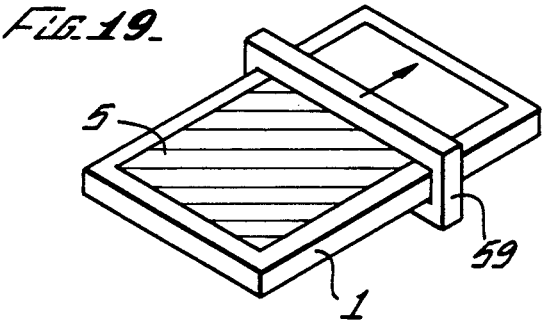
FIG. 19 is a perspective drawing of an apparatus for stretching a film.

A ninth solution to achieving flat layers is to orient the film horizontally and increase its area to augment the film tension beyond its value when in a relaxed, equilibrium state. The stretching of the film is just prior to flash exposure and must be completed before the film has relaxed into a sagged state. Flash exposure is required because it avoids movement of pieces of the layer which are not yet secured to the previous layer. Film stretching can be implemented using a support frame whose area expands. A simple method to accomplish this is a frame 1, equipped with a sliding element 59 (FIG. 19). However, because exposing a film not in equilibrium may lead to a non-uniform thickness, a frame which grows in area on all sides may give better results.

A tenth solution to achieving flat layers is to increase the surface tension of the resin. This will decrease the depth of the sag even with the film at equilibrium. However, it is probably incompatible with easy creation of the film because high surface tension liquids resist the deformations usually associated with creating a film.

An eleventh solution to the need for flat layers is to eliminate the need. Instead of compensating for gravitational sag, it is possible to build stereolithographic parts using non-flat, sagged pre-layers of resin (FIG. 20), as long as the original object was mathematically sectioned by a computer program such as "Slice" into non-flat layers. "Slice" is described in co-pending application Ser. No. 331,644 filed Mar. 31, 1989, entitled "METHOD AND APPARATUS FOR PRODUCTION OF HIGH RESOLUTION THREE-DIMENSIONAL OBJECTS BY STEREOLITHOGRAPHY". This approach requires that the films always sag into a very consistent shape, which indicates that the weight of the film and thus the amount of resin it contains must be very repeatable. Naturally, this is already a requirement if the films are to have consistent thickness. Furthermore, the shape of the working surface must be known prior to applying the computer program to "Slice" the object. Although the calculations required to "Slice" the object into non-planar layers are more extensive than those of the prior art, exposure of these films using scanned radiation can produce better results. This is because the focal surface of scanned radiation is spherical; thus the radiation incident on a sagged film from a point-like source above it will be in better focus than with the planar working surface of the prior art. Furthermore, because the curved surface produced by a sagging film is more spherical than planar, the geometric corrections required to correct distortions with the prior art (due to oblique angles of incident radiation from a rotatable central mirror) will be smaller in the present invention, resulting in better accuracy. Use of a sagged film may, however, aggravate film non-uniformity.

A seventh difficulty is film disintegration. Like soap films, resin films are fragile and can disintegrate. There are at least seven possible causes of film disintegration in RFR, which are dealt with in the present invention as follows:

A first cause is contact with solid objects, particularly if sharp or not wet by resin. Even roughness of the support frame edges can cause problems. The solution is to make the frame edges smooth and keep them clean (especially of cured resin).

A second cause of film disintegration is evaporation of resin constituents such as vinyl pyrrolidinone (used in current resin). The solutions are described above.

A third cause is too-rapid stretching of the film in an attempt to increase its area or achieve flatness or by rapid movement of the film through the air or other fluid medium, causing its distortion by air resistance. The solution is to stretch the film no faster than it can tolerate (possibly pausing occasionally for it to reach equilibrium) and to avoid moving it quickly through fluid media.

A fourth cause is too-rapid acceleration of the film, causing flow of resin within the film and possible thinning of certain areas beyond a sustainable limit. The solution is to avoid rapid accelerations when moving the film from the station where it is formed to the area where it is exposed.

A fifth cause of film disintegration is contamination by foreign substances, including solvents. Since RFR requires the removal of unhardened resin between each layer, contamination of the film may occur if solvent stripping was used to clean the previous layer and traces of the solvent remain. One solution is to completely evaporate the solvent, possibly by the use of warm air. Another solution is to wash away the solvent with another liquid which cannot contaminate the resin. Yet another solution is to use an alternate means of stripping between cross-sections, such as vacuuming the excess resin through a fine mesh 59, the holes 61 of which allow liquid 47 to pass but prevent exposed resin from being sucked towards the vacuum (FIG. 21).

A sixth cause of film disintegration facing RFR is too-rapid absorption of synergistic radiation energy. If the rate at which the resin produces exothermic heat while curing exceeds the rate at which it can be dissipated by conduction, radiation and convection, the temperature rise adjacent to the exposed regions may cause disintegration of the film. This can happen due to evaporation of constituents, surface tension changes or by other mechanisms. Absorption of radiant energy might also disrupt the film by direct conversion to heat or through other mechanisms. A solution to too-rapid absorption is to allow more exposure time to avoid high power and to provide no more exposure than is necessary. If it is required to use a high power exposure to increase machine thruput, the solutions to excessive temperature rise are increasing the specific heat of the resin formulation, increasing the thermal conductivity of the resin formulation, or increasing the flow rate or specific heat of the surrounding fluid to provide better cooling of the film. Another solution to too-rapid absorption is to use flash exposure so that the layer is completely formed and adhered before disintegration of the film.

If the possibility of film disintegration exists, the stereolithography machine must be equipped with a means for detecting whether the film is intact immediately prior to exposure. If disintegration is detected, the support frame can be removed and a new film formed on it, then repositioned and the process continued. Detection can be provided by sensing a small region of the film near the support frame with a suitable sensor. Some methods of detecting the presence of the film are sensing the reflection from the film surface or the attenuation through the film of incident, non-synergistic radiation.

An eighth difficulty overcome by the present invention is non-uniform thickness. Given enough time, surface tension will ensure that the thickness of a resin film is fairly constant over most of its area. But at equilibrium, the film thickness is greatest at its line of attachment to the support frame, and decreases asymptotically away from this line. This is acceptable if the film is made large enough to accommodate not only the working area 65 but also a surrounding guard band 67 (FIG. 22) in which there is no exposure. The width of the band 67 is made large enough that the film thickness in the working area within is not seriously perturbed by the support frame. Use of a guard band 67 also ensures that the film will not be exposed adjacent to the frame, which would cause hardened resin to adhere to it.

Temporary non-uniformities in thickness occur within the working area in the early stages of the film. If the film is thicker than its equilibrium condition warrants, the excess resin typically will flow to the lowest point on it; if the film is sagging and horizontal this will be near the center. Accompanying the resin from the film itself may be resin from the support frame. The thickness at the low point may increase so much that a drop is formed which hangs from or falls off the film. To minimize this, it is important to use as little resin as possible when forming the film. To prevent accumulation of the excess within the working area and to encourage draining, the lowest point of the film and support frame must be arranged to be outside the working area.

One solution to non-uniform thickness is orienting the frame at an angle to the horizontal such that part of it is lower than the entire working area of the film (FIG. 23). To accelerate draining from the frame, means of allowing the resin 47 to easily separate from the frame can be provided, such as drip needles 69. When fully drained, but before the highest part of the film has become too thin, the frame can be oriented horizontally.

Another solution to non-uniform thickness is orienting the frame horizontally, and over-compensate for gravity by increasing the air pressure beneath the film relative to that above it. The result will be a dome-shaped film (FIG. 24) from which excess resin will flow readily towards the frame, where it can be drained off. When fully drained, but before the high portion of the frame has become too thin, the pressure differential can be reduced so that a flat working surface results.

Because the flow rate for resin is limited by its viscosity, temporary heating of the film and/or frame may be used to help rid the film of excess resin. The film can be heated by heating the air or other medium in which it is immersed, by absorption of infrared radiation, for example. The frame may be heated electrically, for example.

A ninth difficulty overcome by the present invention is improper layer thickness. It may be possible in some applications to form films in a way that the thickness and thus the pre-layer thickness is very repeatable. If this is not the case in other applications, means must be provided to both measure and obtain the correct thickness. Measurement can be achieved by an interferometer, for example. The correct thickness can be obtained by monitoring the thickness while the film is draining and thinning and exposing (probably by flash) when the correct thickness is measured. The correct thickness can also be obtained by measuring the thickness after the film has reached equilibrium and changing the area of the support frame to change the thickness (the frame must be large enough that its smallest area is at least as large as the working area.) The support frame area would be determined by feedback from the thickness measurement device so as to regulate film thickness in a servo loop.

Given the ability to control layer thickness, it is not necessary to control it for every film which is exposed, depending on the vertical accuracy required. In some cases, it may be sufficient to measure the cumulative thickness of several successive films and periodically provide a "compensation" film of a carefully-controlled thickness to restore the desired total thickness of that group of films.

A tenth difficulty addressed by the present invention is resin shrinkage. Because stereolithographic resin may shrink upon hardening, the cured layer will be thinner than the pre-layer from which it was generated. If the previous layer is translated away from the working plane by the thickness of its pre-layer, there will result a gap between it and the next pre-layer which will prevent layer-to-layer adhesion. If the degree of shrinkage is small, the gap may not be large enough to cause a problem between the first two layers, but would increase in size as more layers accumulated until adhesion failed. Formulating the resin for zero shrinkage will eliminate this difficulty. Resin shrinkage can be compensated for by generating pre-layer films which are slightly thicker than the layer thickness assumed when slicing the part and when translating it away from the working plane.

An eleventh difficulty is motion of unattached sections. If vector or raster scanning exposure is employed, there will often be sections of the layer formed which do not touch the previous layer and which therefore have no point of attachment to the part built so far. These sections are held in place only by their attachment to other sections of the same layer. If the latter have not yet been hardened, the unattached sections may move, under the action of several forces, from the position which they occupied during exposure, causing severe part distortion. Since flash exposure hardens the entire layer simultaneously, it bypasses this problem. If an exposure method is used which is not simultaneous, extra supports can be provided for the part so that all otherwise-unattached sections are attached to the previous layer. A more elegant solution to this difficulty is eliminating the forces which might cause sections to move. One force is caused by density differences between liquid and cured resin. The solutions are formulating the resin for zero shrinkage upon curing or ensuring that the film is flat and horizontal, so that there is no point on it toward which heavier material will tend to move. A second force is viscous drag and pressure gradients resulting from resin flow across the film, driven either by gravity or surface tension. The solution is to ensure that the film is substantially free of excess resin before exposure. A third force is surface tension gradients resulting from non-uniform temperatures due to the heat of reaction or to energy absorption. The solutions are formulating the resin to reduce dependence of surface tension on temperature or using the methods above to minimize non-uniformity of temperatures. A fourth force is motion of the surrounding fluid, such as air currents blowing across the film. The solution is to mechanically shield the film from movement in the surrounding medium, if the movement cannot be sufficiently reduced.

A twelfth difficulty overcome by the present invention is stripping within surfaces. Because of post curing and the immersion of previous layers in resin, the prior art allows the formation of solid part volumes which are thicker than the width of the line formed by the moving spot of synergistic radiation. Such a volume is produced by hardening only its external surfaces 71 (generated by layer borders 73 or skin 75) and an internal support lattice (crosshatch 77) during part building, and allowing liquid resin to become trapped within these structures (FIG. 25). Flood exposure of the part during post curing then hardens the trapped liquid. (While this approach may increase part building speed, the presence of trapped liquid can cause distortions of the part. The weight of the liquid may distort the part surfaces when the part is removed from its buoyant environment within the resin. Furthermore, shrinkage of the liquid during post curing can exert stresses which further distort these surfaces). With RFR, unexposed resin must be removed after each exposure because it would attach itself to the next pre-layer, distort its thickness, or otherwise be exposed in an uncontrolled location in the part while a future layer was being formed. The solvent and the duration of exposure to the solvent must be selected so that stripping does not weaken the green layers or contaminate them in a way that harms layer adhesion. It is problematic to selectively extract unexposed resin such that liquid between surfaces 79 is left intact and liquid exterior to surfaces 81 is removed (FIG. 26a). Therefore, the width of regions in the final part is limited to the width exposed when each layer is formed. If there is a requirement for solid volumes, for example, this must be done by exposing the resin between surfaces as in FIG. 26b. This also serves to increase the strength of the layers, which are flimsy due to their thinness. These internal regions do not require full curing if the part will later be post cured or if complete curing of the part is not required; however, they must be cured sufficiently to avoid removal by the method used for stripping. Since raster or flash exposure requires no more exposure time or power to cure the internal regions, these methods may be more suitable than vector exposure for use with RFR.

A First Preferred Embodiment

FIG. 27 illustrates a first preferred embodiment of the present invention. It consists of a tank 82 with inlet/outlet valves 83, 85, 87 attached to a funnel-shaped structure 89. Valve 85 is associated with a reservoir of resin and a resin pump (if several resins are to be used, there are several valves, reservoirs and pumps.) The resin is formulated with low enough surface tension that it readily forms a film, and with few or no volatiles (if evaporation is a problem, a resin evaporator can be provided to fill the air surrounding the film with resin volatiles in the proper concentration: it is assumed here that this is not required.) Valve 87 is associated with a reservoir of resin solvent, a solvent pump and possibly a solvent recycling system to purify the solvent of dissolved resin. Valve 83 is associated with an air compressor, a heater and a variable, very repeatable regulator. The funnel increases in cross-sectional area upwards until reaching the maximum throat at 91, then the taper reverses for a short distance until the upper edge 93. The entire edge 93 lies within a plane and the radius of curvature of the edge is constant along the entire length. A window 95, substantially transparent to the synergistic radiation is located at the bottom of the tank, surrounded by a wall 97. Beneath the window are imaging optics 99 and an imaging mask 101. The imaging mask consists of regions which are substantially opaque and others which are substantially transparent to the synergetic radiation, providing adequate contrast between the two. The mask may be erasable and programmable, and it allows exposure of the film between the layer borders (i.e., between the surfaces of the final part). Beneath the mask is a source 103 of broad spectrum, incoherent synergetic radiation which can be flashed (or is equipped with a shutter, not shown). The source illuminates the mask. Above the funnel is the part-building platform 105 to which is attached the part-in-progress 41; it is translated vertically by an elevator (not shown). Near the upper edge of the funnel is located an interferometer 107 for checking film integrity and measuring film thickness. The process of building a part consists of repetitions of the following cycle, for each layer (or each film exposed, if several films are exposed per layer). It is assumed here that a number of layers have already been formed:

Step 1.1 Resin loading (FIG. 28a). The resin valve 85 opens and resin 47 is pumped into the tank 82 until the resin surface reaches the bottom edge of the funnel 111.

Step 1.2 Film formation (FIG. 28b). The resin is pumped out of the tank until it is empty. As the resin surface drops away from the edge 111, a film of resin 51 pulls free and closes off the lower end of the funnel. The resin valve closes.

Step 1.3 Film manipulation/window cleaning (FIG. 28c). The air valve 83 opens and air is pumped into the tank, creating a pressure difference across the film which slowly pushes it upwards within the funnel, against its surface tension (which resists the increase in area) and gravity. Since the film is attached to the funnel walls, its area increases as it ascends. The pressure difference is also large enough that the film has a domed (upper surface convex) shape as it rises. Since the excess resin in the film is draining, it flows away from the film center and towards the periphery, where it is transferred to the funnel walls. The resin 47 flows down the walls and eventually drips from the lower edge of the funnel onto the tank floor, outside the wall 97 surrounding the window 95. As the film 5 is being pushed upwards, the solvent valve 87 opens and solvent 113 is pumped into the tank to dissolve the resin which is coating the window.

Step 1.4 Thickness monitoring (FIG. 28d). The film reaches the maximum throat 91 and continues to rise, now moved upwards not only by air pressure but by surface tension acting to reduce the surface area. When the film contracts to the upper edge 93 of the funnel, it is stably positioned. The reverse taper is steep to prevent the film from attaching itself to anything but the edge. The solvent 113 is now pumped out of the tank and the solvent valve 87 is closed. The thickness of the film is monitored by the interferometer 107. As the domed film continues to drain above the working plane 115, the thickness decreases. When the desired film thickness is obtained (compensated for resin shrinkage, for the slight stretch in the film and for the fact that the thickness is not uniform at this time), the next Step is triggered. If the film thickness cannot be measured, the film has disintegrated and the cycle starts over again to provide the missed exposure.

Step 1.5 Flattening (FIG. 28e). The air pressure is lowered so that the gradient across the film is precisely enough to compensate for gravitational sag, thus making the film very flat and establishing the working surface at the working plane 115. The film also acquires a uniform thickness.

Figure 28F:
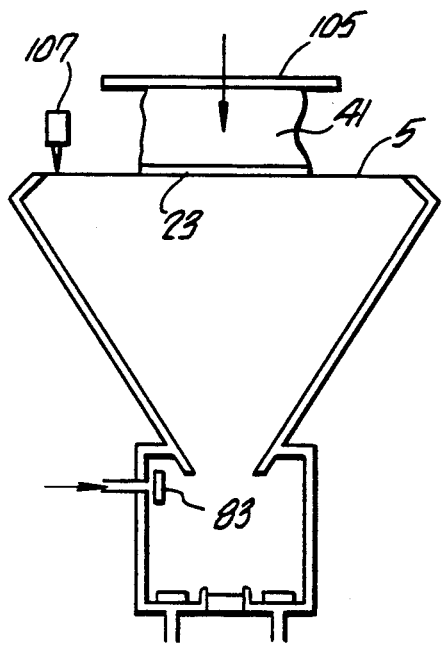

Step 1.6 Part contact/film checking (FIG. 28f). The part is lowered until the previous layer 23 just contacts the film (Note: it is conceivable that Step 1.6 may take place before Step 1.5, such that the previous layer contacts first the domed center of the film. Then as the pressure is reduced and the film is flattened, the part continues to descend and contact is made with the entire previous layer.) The interferometer 107 determines whether there is a reflection from the film, indicating that the film has not disintegrated. If no reflection is found, the process skips to Step 8 (indicating the film may have disintegrated upon contact with the part and therefore the part needs cleaning) and the cycle starts over again to provide the missed exposure.

Figure 28G:
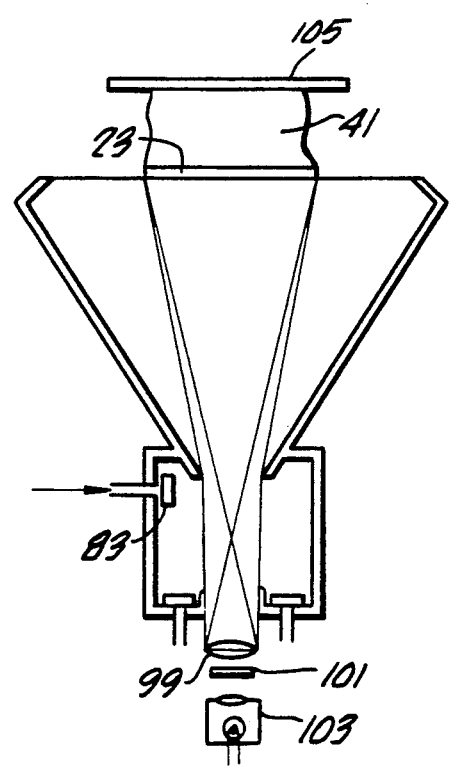

Step 1.7 Exposure (FIG. 28g). The source of synergetic radiation 103 is activated (or a shutter is opened) so that the pattern on the imaging mask 101 is projected by the imaging optics 99 onto the film 5 (i.e, pre-layer). The exposure is sufficient to fully cure the film in the unmasked areas. The size of the window 95 is restricted so as to shadow an area of the film and create a guard band.

Figure 28H:
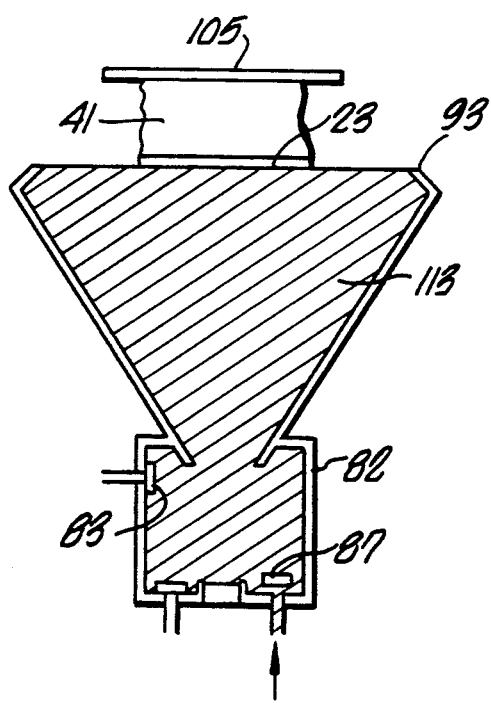

Step 1.8 Stripping (FIG. 28h). The air valve 83 is closed, the solvent valve 87 is opened and solvent 113 is pumped into the tank 82 and funnel 89. The solvent rises until it has reached the upper edge 93 of the funnel and comes into contact with the film (the part-in-progress 41 may descend slightly within the funnel to facilitate this.) The unexposed regions of the film are dissolved by the solvent.

Figure 28I:
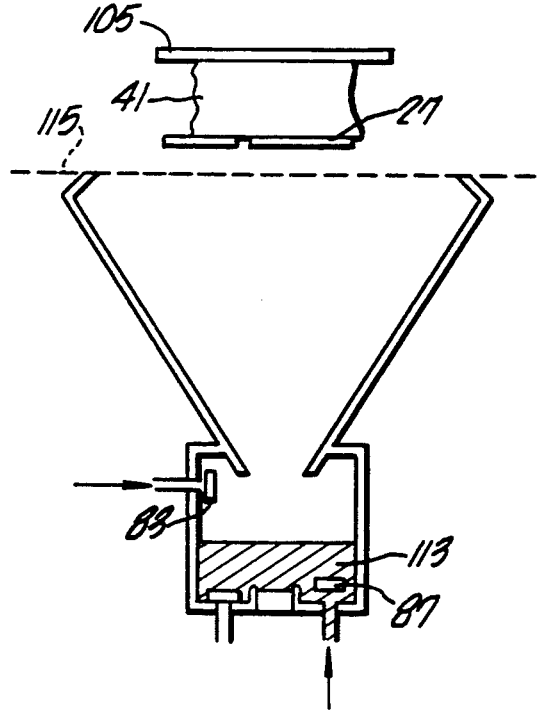

Step 1.9 Drying (FIG. 28i). The solvent 113 is pumped completely out of the funnel and tank and the solvent valve 87 is closed. The air valve 83 is then opened and heated air is pumped into the tank and funnel to assist in evaporating the solvent (this may not be necessary). The air rises and helps to dry the part as well. The part-in-progress 41 rises vertically until the newly-formed layer 27 is sufficiently above the working plane 115 that it will not prematurely contact the domed surface of the next film.

A Second Preferred Embodiment

FIG. 29 illustrates a second preferred embodiment. The first preferred embodiment has the advantages of simplicity and few moving parts, but suffers from a cycle time between exposures of several tens of seconds. The steps which require the longest time are 1.3, 1.4, 1.8 and 1.9. For parts typically made with the prior art, the building time would be several days even if rather thick 0.001" films are obtained. Although such a thruput is not unreasonable considering the excellent resolution obtained, the second preferred embodiment allows much faster part building and is therefore the most desirable mode of implementing the invention.

The second preferred embodiment achieves greater thruput by allowing steps 1.3 and 1.4 to occur in parallel on a multiplicity of films, and also by eliminating the filling and emptying of a large volume as in steps 1.8 and 1.9. Since the funnel is never cleaned with solvent, a thin coating of resin is always maintained on the funnel walls, which facilitates movement of the film within the funnel.

Figure 30A:
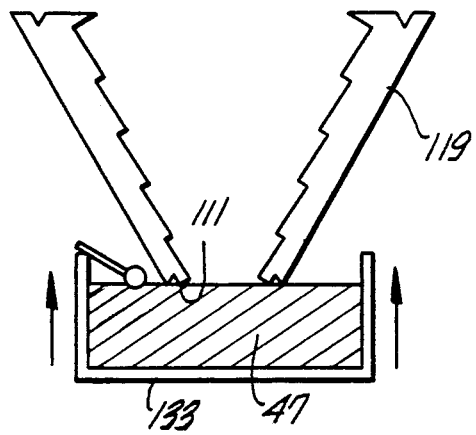

The second preferred embodiment is shown in FIG. 29. It consists of a carousel 117 on the periphery of which are attached several funnels 119. The funnels are shown with circular cross section but other shapes are possible. The funnels are spaced apart so as to allow enough room between them for an exposure plate 121 to which is attached an exposure system 123. The plate and system can be moved vertically by a mechanism (not shown) so that the plate can come into contact with a frame 125 which can also move vertically (by a smaller distance). The positions occupied by the funnels are indicated as P1 through PN, where the number of funnels is N/2, P1 is the position just after the exposure plate and PN is the position of the exposure plate. The funnels are indexed one position at a time by the clockwise rotation to the carousel. At each odd-numbered position except P1 is an air coupler 127. All air couplers can move vertically by a small distance by a mechanism (nor shown). In addition, there is a coupler at position PN which can retract out of the way by moving horizontally to allow the exposure plate to move up and mate with the frame. The exposure plate is equipped with two valves 129 and 131. Valve 129 is associated with a supply of air; valve 131 is associated with a reservoir or resin solvent. Below the funnel in position P1 is a resin tank 133 containing resin 47. The resin is formulated with low enough surface tension that it readily forms a film, and with few or no volatiles (if evaporation is a problem, a resin evaporator can be provided to fill the air surrounding the film with resin volatiles in the proper concentration: it is assumed here that this is not required.) The tank 133 can move vertically a small distance and is equipped with a level sensor 135 (here shown to be a float) which meters resin into the tank to maintain a constant level (resin source not shown). Above the frame is the part-in-progress 41 attached to a platform 105 and moved vertically by a mechanism (not shown). The process of building a part consists of repetitions of the following cycle, for each layer (or each film exposed, if several films are exposed per layer). It is assumed here that a number of layers have already been formed. A single funnel 119 is shown starting at position P1 and progressing to position PN in FIGS. 30a, 30b, 30c, 30d, 30e, 30f, 30g, 30h, and 30:

Step 2.1 Resin application (FIG. 30a). The tank 133 at position P1 is raised until the resin 47 contacts the lower edge 111 of the funnel 119.

Figure 30B:
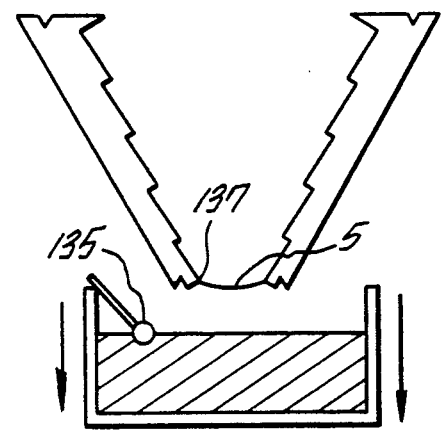
Figure 30C:
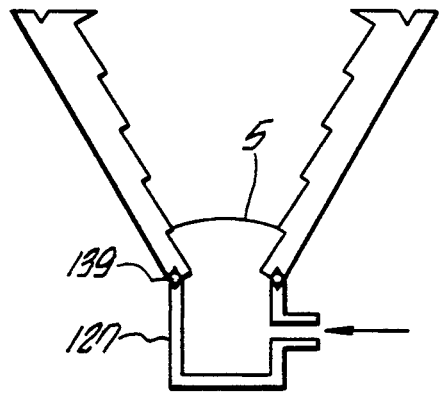
Figure 30D:
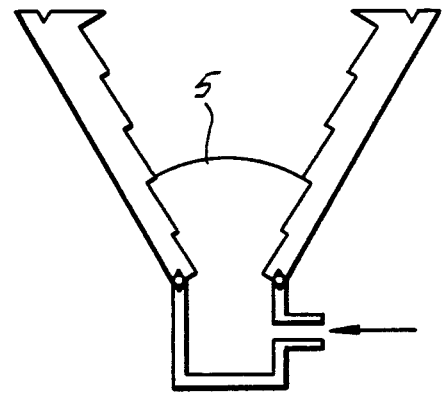
Figure 30E:
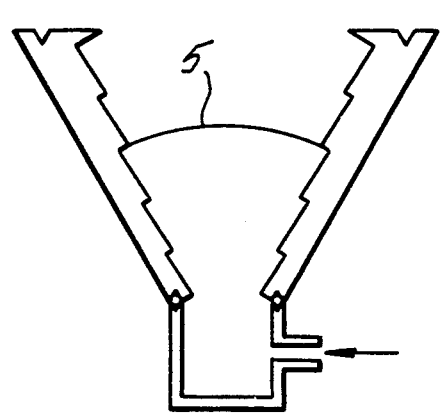
Figure 30F:
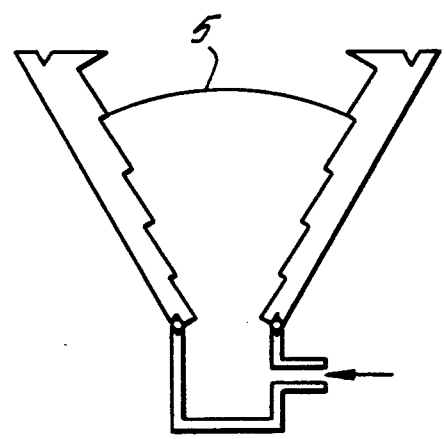

Step 2.2 Film formation (FIG. 30b). The tank 133 is lowered, leaving behind a film 5 of resin which contracts and rises upwards to the lowest of several ridges 137 on the inside of the funnel. The level sensor 135 may meter more resin into the tank to compensate for the volume lost to the film.

Step 2.3 Film stretching and draining (FIGS. 30c, 30d, 30e, 30f, and 30g). The funnel is then indexed by the carousel to position P3 where the air coupler 127 rises to make airtight contact (sealed by an O-ring 139) with it. Air is pumped into the coupler to create a pressure difference across the film which causes it to assume a domed shape suitable for draining excess resin and also to rise within the funnel walls until it reaches the second ridge. The pressure is selected so as to cause the film to reach the next higher ridge prior to the next indexing of the carousel. If indexing occurs when the film is slightly beneath the ridge, it will contract to the ridge because of the reverse taper of the funnel. The same is true if the film is above the ridge. Thus the only stable position of the film within the funnel is at a ridge. Prior to indexing, air flow is stopped and the coupler descends slightly to free the funnel (all couplers descend at the same time). The carousel then indexes, bringing the funnel from position P3 to P4, between couplers. The carousel pauses briefly at P4 (and at all even-numbered positions) to allow the transfer of a film from the funnel beneath the frame to the frame (see Step 2.4). Then it moves to position P5, where the coupler again makes contact with the funnel (FIG. 30d) and the film, which has sagged while in transit between couplers, but which has not moved, is again pressurized into a dome shape is raised to the next higher ridge. The process continues (FIGS. 30e, 30f, and 30g) until the film is at the upper lip of the funnel at position PN-1. FIG. 30h shows the descent of the coupler and the sag of the film at this position prior to indexing.

Step 2.4 Film transfer (FIG. 30i). The carousel is indexed so as to move the funnel from position PN-1 to position PN, where it will remain only briefly. The frame 125 descends and mates with the top of the funnel, forming an airtight seal due to the O-ring 143. The coupler at position PN rises and the differential air pressure forces the film to move across the closely mating surfaces of the funnel and the frame 125 and stop at the upper edge 141 of the frame 125. The exposure plate 121 is below the funnel and coupler. After transfer, the coupler 127 descends and moves out of the way, the frame 125 rises to decouple from the funnel and the funnel is indexed to position P1 to repeat the cycle with Step 1. The remaining Steps involve processes which occur at position PN for the film just transferred; these processes occur on one film simultaneously with other films in other funnels being formed or stretched and drained.

Step 2.5 Thickness monitoring and flattening (FIG. 30j). The exposure plate 121 rises and mates with the frame 125, with O-ring 143 providing the airtight seal. Air valve 129 is opened and the film is pressurized until it is domed and can continue to drain and decrease in thickness. The thickness is monitored by the interferometer 107; if the interferometer does not detect the film, it has disintegrated and the process skips back to Step 2.4, in which the next film is transferred to the frame. When the desired film thickness is obtained (compensated by resin shrinkage, for the slight stretch in the film and for the fact that the thickness is not uniform at this time), the air pressure is reduced to make the film flat throughout the working area.

Step 2.6 Part contact, film checking and exposure (FIG. 30k). The part is lowered until the previous layer 23 just contacts the film 5 (Note: it is conceivable that Step 2.6 may take place before flattening, such that the previous layer contacts first the domed center of the film. Then as the pressure is reduced and the film is flattened, the part continues to descend and contact is made with the entire previous layer.) The interferometer 107 determines whether there is a reflection from the film, indicating that the film has not disintegrated. If no reflection is found, the process skips to Step 2.7 (indicating the film may have disintegrated upon contact with the part and therefore the part needs cleaning) and then returns to Step 2.4 to continue with another film. The source of synergetic [what is synergetic as opposed to synergistic?] radiation 103 is activated (or a shutter is opened) so that the pattern on the imaging mask 101 is projected by the imaging optics 99 onto the film 5 (i.e, pre-layer). The exposure is sufficient to fully cure the film in the unmasked areas. The size of the window 95 is restricted so as to shadow an area of the film and create a guard band 144.

Step 2.7 Stripping (FIG. 30l). The air valve 129 is closed, the solvent valve 131 is opened and solvent 113 is pumped into the exposure plate 121. The solvent rises until it has reached the upper edge 141 of the frame and comes into contact with the film 5 (the part-in-progress 41 may descend slightly within the funnel to facilitate this.) The unexposed regions of the film are dissolved by the solvent.

Step 2.8 Drying (FIG. 30m). The solvent 113 is pumped below the level of the frame and the exposure plate 121 begins to descend, with the solvent continuing to drain out until empty; then the solvent valve 131 is closed. If required for the solvent chosen, heated air can be directed against the bottom of the part, the frame and the exposure plate to aid the evaporation of the solvent. The frame 125 rises slightly to clear the next funnel to arrive for film transfer. The part-in-progress 41 rises vertically until the newly-formed layer 27 is sufficiently above the working plane 115 that it will not prematurely contact the domed surface of the next film.

A Third Preferred Embodiment

A third preferred embodiment involves the application of a separately-formed resin film to the surface of a volume of resin.

The third preferred embodiment has several advantages. The elimination of a thin layer during exposure solves the problem of interference of radiation. If the film is too thin, several can be stacked up on top of the volume of resin to yield a stable, thicker pre-layer. Films which are combined in free space on the other hand, will thin out with time. The film is flat because it is supported by the flat surface of a liquid volume. There is no problem with stripping within surfaces because there is no stripping during part building. There are no problems associated with using vector or raster exposure.

The third preferred embodiment may not be desirable under certain circumstances. For example, resin shrinkage of exposed regions 21 causes them to drop below the top of the pre-layer and produce a non-flat surface to support the next pre-layer (FIG. 31). Regions of the pre-layer 145 can be lowered relative to the cured regions by raising the part-in-progress 41. However, this will not have any affect on "trapped" regions 147. A doctor blade which sweeps across the layer and trims away excess material may function on some geometries, but on trapped volume geometries suffers from underflow, like the blade recoater of the prior art. Underflow is the movement of resin beneath the recoater blade, especially over a trapped volume, such that the volume of resin trimmed by the blade is less than desired. Therefore a general solution requires zero-shrink resin. Because the surface of the volume of resin is always horizontal, leveling or the machine is critical as with the prior art.

The third preferred embodiment incorporates parallel processing of films to yield increased thruput. The mechanisms for creating, enlarging and draining the film are different than those of the previous Embodiments, but the choice of mechanisms is optional for they are interchangeable with the other Embodiments.

FIG. 32 is a cross-sectional drawing of the third preferred embodiment. A series of film carriers 149 travel incrementally around in a counterclockwise manner by a drive mechanism not shown. At the bottom edge of each carrier 149 are one or more (optional) retractable drip needles 69. There are a number of positions which can the carriers 149 can occupy; for N carriers the positions are indicated as P1 through PN. In this example, N=10. Within the loop described by the carriers is a squeegee belt 151 rotating counterclockwise at a slower linear speed than the carriers. The belt is equipped with squeegees 3 which contact the lower edges of the carriers in positions P1 through P3. On the upper side of the loop, in positions P5 through PN-1 is a vacuum manifold 153 which makes an airtight seal with several of the carriers when they are being indexed from position to position. Beneath the carrier at position PN-2 is an interferometer 107. Beneath the carriers at positions PN-1, PN-2, and PN-5 is a drip catcher 155 which drains into a reservoir 157 filled with zero-shrinkage resin 47. The resin is formulated with low enough surface tension that it readily forms a film, and with few or no volatiles (if evaporation is a problem, a resin evaporator can be provided to fill the air surrounding the film with resin volatiles in the proper concentration: it is assumed here that this is not required.) The reservoir 157 feeds a delivery tube 159 having one or more openings adjacent to the junction of the lower edge of the carrier at P1 and one of the squeegees. Resin is metered through the delivery tube by valve 161. Above and to one side of the reservoir is a vat 43 equipped with a resin-tight piston 49. External to the vat 43 is a surrounding gutter 163 which collects and transfers excess resin from films applied to the top edge of the vat 43 into reservoir 157. Within the vat is a part-in-progress 41. The process of building a part consists of repetitions of the following cycle, for each layer (or each film exposed, if several films are exposed per layer). It is assumed here that a number of layers have already been formed. FIGS. 33a–j show a single carrier starting at position P1 and progressing to position PN:

Step 3.1 Resin application (FIG. 33a). The valve 161 is opened and resin flows into the delivery tube 159 and issues from holes (or a slit) 165 into the junction between the lower edge 167 of the film carrier 149 at position P1 and the edge of the squeegee 3.

Step 3.2 Film formation (FIGS. 33b–d). The carrier is indexed to position P2 while the squeegee is advanced by a smaller distance because of the lower linear speed of the squeegee belt (FIG. 33b). This causes the squeegee to lag behind the leading edge 169 of the carrier 149 and to draw out a film 5, supported by the edges of the carrier 149 and the edge of the squeegee 3. When the carrier is indexed to position P3, the film is stretched out more (FIG. 33c) until it finally is supported by the trailing edge 171 of the carrier 149 and the squeegee 3 has been left behind the carrier 149 as it is indexed from position P3 to position P4.

Figure 33E:
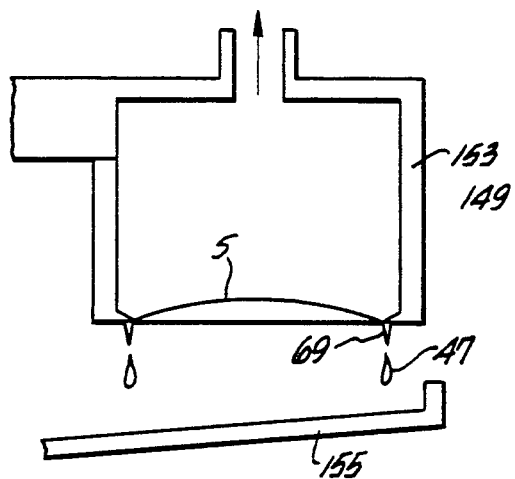

Step 3.3 Film draining and thickness monitoring (FIG. 33e). The film begins to drain while vertical at position P4, then is indexed to position P5 where it becomes horizontal at the underside of the carrier 149. In this position, the carrier 149 forms an airtight seal with a section of the vacuum manifold 153. Air is pumped out of the manifold, creating a pressure differential across the film which causes it to assume a domed shape suitable for draining. The drip needles 69, formerly retracted when the carrier was inverted, now extend downwards due to gravity and provide a means for excess resin 47 to drip towards the drip catcher 155. The carrier is then indexed through position PN-2, with the film sagging momentarily while in transit, but regaining its domed shape at each successive section of the manifold. At position PN-2, an interferometer 107 measures the film thickness. When the desired film thickness is obtained, the carrier is indexed to position PN-1.

Figure 33F:
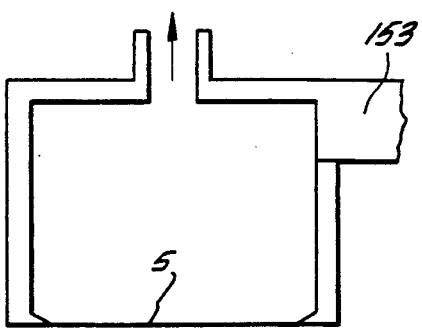

Step 3.4 Film flattening (FIG. 33f). At position PN-1, the air pressure differential provided by the last section of the vacuum manifold 153 is smaller than at the other sections and is accurately regulated to provide a flat film. The film, no longer draining, acquires a uniform thickness.

Figure 33G:
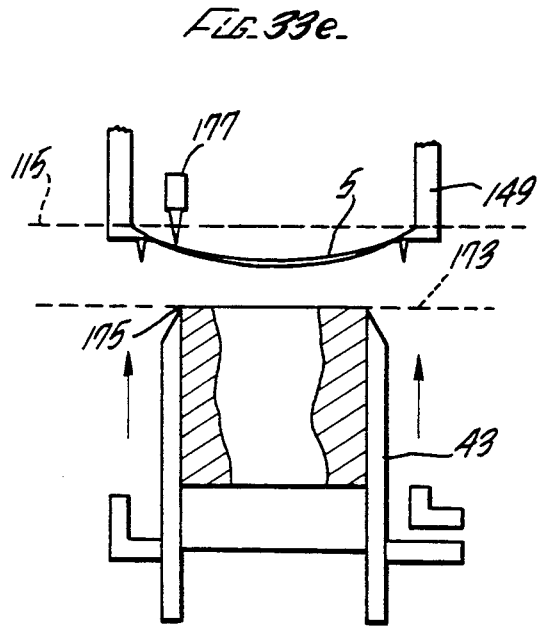
Figure 33H:
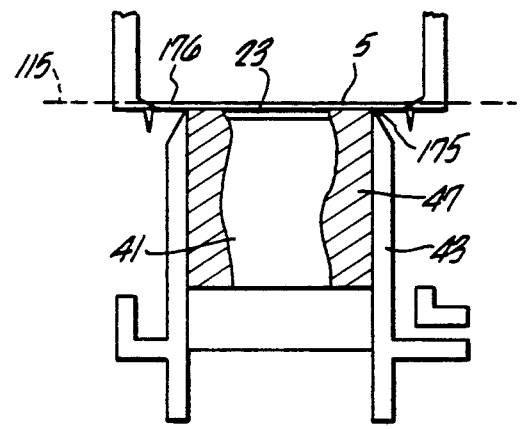

Step 3.5 Film application and checking (FIGS. 33g and 33h). The carrier is indexed to position PN where it is above the vat 43. Since no vacuum is provided in this position, the film sags momentarily (FIG. 33g). A film checker 177 reflects light from the surface of the film outside the vat to verify that it is still intact. The vat rises until the plane 173 coincident with its upper edge 175 is below the working plane 115 by a distance equal to the film thickness as shown in FIG. 33h. The lowest point of the film touches the top of the previous layer 23 or the surrounding resin 47. As the vat is raised, the film 5 flattens and lays across the upper edge of the vat 175 and surfaces of the previous layer and the resin 47. At the same time, the upper surface of the film moves to coincide with the working plane 115. The lower edges of the carrier span a wider area than the upper edges of the vat, to provide a guard band 176 in which the film thickness is not uniform. Because the thickness or flatness of the film may also be slightly irregular near the vat 43 edges, the working area of the film is slightly smaller than the area enclosed by the edges of vat 43.

Figure 33J:
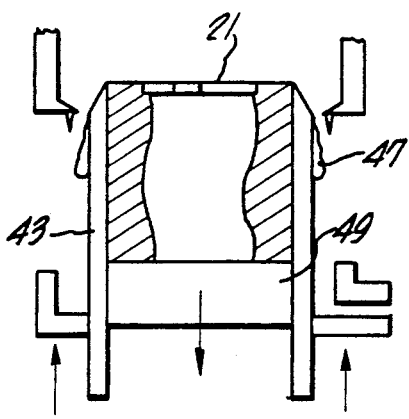
Figure 33I:
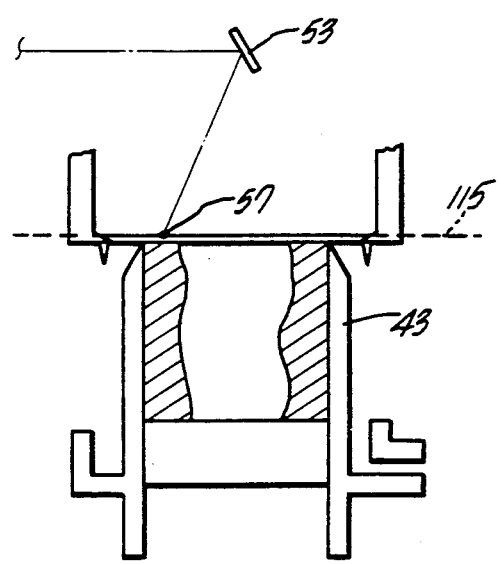

Step 3.6 Exposure (FIG. 33i). Synergistic radiation (in this example, delivered by a mirror 53 to create a spot 57 on the surface of the film) selectively exposes the film at the working surface, in the same manner as the prior art.

Step 3.7 Film integration (FIG. 33j). The vat 43 rises while the piston 49 drops relative to the vat by a distance equal to the film thickness. The combination of these actions causes the film outside the vat edges to disintegrate and the resulting resin 47 to flow down the tapered vat edges towards the gutter below, and from there to the reservoir for recycling. That portion of the film within the vat walls now consists of a combination of exposed sections 21 of the new layer and surrounding resin 47. The vat and piston then descend together to the position occupied prior to Step 3.5. The carrier is then indexed to position PN+1 while the next carrier and film move into position above the vat for the cycle to repeat.

A Fourth Preferred Embodiment

A fourth preferred embodiment involves the use of RFR to making very small parts with stereolithography; this is referred to as MicroStereoLithography (MSL). By restricting itself to parts made of layers with a linear dimension one or two orders of magnitude smaller than those of the prior art, MSL can overcome to a large extent some of the difficulties of RFR. A very small part is one with a typical linear dimension of 0.1-1."

Films with a small aspect ratio (defined as minimum linear dimension/film thickness) are easily formed, for example by dipping the frame directly into resin and withdrawing. This solves the first difficulty described above. A small aspect ratio is below about 50,000.

Because small aspect ratio films are easier to form, the surface tension can be higher, thereby addressing the third difficulty described above.

The fifth difficulty described above, the thinness of films by comparison to the height of the part is no longer a liability with the fourth preferred embodiment. On the contrary, small parts will require the resolution of very thin layers.

To ensure layer accuracy, the deviation from flatness of a film over its working area must be a fraction of the film thickness. This requires special arrangements for high aspect ratio films, as described above with respect to the sixth difficulty of RFR. However with MSL films, the working area is much smaller and local flatness much easier to achieve. It may be desirable to use only a small fraction of the entire film area as the working area in order to achieve this, and not compensate for gravitational sag.

Low aspect ratio films are more stable and stronger, and are less subject to disintegration which is described above as the seventh difficulty.

By limiting the working area to a small portion of the film area, non-uniformities in thickness, described as the eighth difficulty above.

To implement MSL there is a need to expose the film surface to very small (of the same order of magnitude as the linear dimension, e.g. 0.1 to 1 inch), very accurate (error within about 0.1 to 1 or 2 mils) patterns of synergetic radiation and to allow for very small (down to about 0.1 to 1 mil) minimum feature size. One means of doing this is through flash exposure of an imaging mask prepared from a larger original; this technique is known for the production of integrated circuits. If vector or raster exposure is preferred, it is necessary to greatly reduce the distance between the moving mirrors and the working surface as compared to the prior art. This serves to reduce the positioning error of the focused spot of radiation due to angular error in the mirrors. Furthermore, reducing this distance allows use of an optical system which can focus radiation to a smaller spot size. In the prior art, the synergistic radiation is ultraviolet light. If a sufficiently-small spot cannot be created with UV, alternative types of radiation might be used to expose the resin, such as X-rays or electron beams, which have much shorter wavelengths.

What is claimed is:

1. A method of creating a three-dimensional object through stereolithography comprising the steps of:
    a) first creating one thin liquid film or a plurality of thin liquid films, said film or films comprising a liquid polymerizable resin capable of solidifying upon exposure to synergistic stimulation and being supported by the force of surface tension and by a frame and then applying said film or films to a previously solidified layer; and
    b) forming a next layer of said object by at least partially solidifying at least one selected portion of said film or films applied to said previously solidified layer by exposing said at least one portion to said synergistic stimulation, said at least one portion corresponding to the cross-sectional shape at a given point of said object.

2. The method of claim 1 further comprising the additional step of removing uncured resin from said film or films.

3. The method of claim 3 further comprising the steps of:
    loading liquid polymerizable resin in a tank;
    forming a film formed from said resin on a narrow end of a funnel;
    adjusting and monitoring the thickness of said film;
    flattening said film;
    checking for film disintegration; and
    stripping uncured resin from said film.

4. The method of claim 3 further comprising the steps of:
    applying a liquid polymerizable resin to a narrow end of a first funnel; and
    forming a first film of said resin applied to said narrow end across said narrow end and moving said first film to a wide end of said first funnel at about the same time as selectively exposing a second film which was similarly formed and moved in a second funnel.

5. The method of claim 4 further comprising the additional steps of:
    creating an air pressure difference between said narrow end and said wide end;

applying said second film to said previously formed layer of said object; and stripping uncured resin from said second film after said selectively exposing step.

6. The method of claim 3 further comprising the steps of:

forming said film across a film carrier; and applying said film to a working plane in a vat.

7. The method of claim 3 wherein said creating step includes:

separately creating a flat film of said resin, said flat film having a small aspect ratio.

8. The method of claim 1, in which said film or films, once created are stretched to increase their area.

9. The method of claim 1, in which a plurality of films are used in the formation of at least one layer, such that the films have certain edges in common and are supported along these common edges by a frame.

10. The method of claim 9, further comprising the step of preventing exposure in the immediate vicinity of said common edges.

11. The method of claim 1, in which a plurality of films are used in the formation of at least one layer, such that a subset of film is created, applied, selectively cured and then stripped, followed by a similar process with remaining subsets of films, such that the total area covered by all subsets is as large as the desired working surface.

12. The method of claim 1, comprising the additional step of minimizing evaporation of volatiles from said film or films.

13. The method of claim 1 further comprising the additional step of adjusting the surface tension of said film or films.

14. The method of claim 13 wherein said adjusting step comprises the addition of a surfactant to said liquid resin.

15. The method of claim 1 further comprising the additional step of selecting the thickness of said film or films and wavelength of said exposure such that said thickness substantially exceeds said wavelength.

16. The method of claim 1 further comprising the additional step of condensing resin vapor prior to exposure.

17. The method of claim 1 further comprising the additional step of counteracting a tendency of said film or films to sag due to privacy.

18. The method of claim 17, wherein said counteracting step comprises vertically orienting said film or films.

19. The method of claim 1, in which said film is exposed immediately after stretching of the film, while in a non-equilibrium state.

20. The method of claim 1, in which stereolithographic parts are formed from at least one non-flat layer, which is the result of using gravitationally-sagged resin film or films.

21. The method of claim 1 further comprising the additional steps of sensing the integrity of said film prior to exposure, and regenerating a new film if the present one is sensed to have disintegrated.

22. The method of claim 1 further comprising the additional step of providing a film which is larger than that required to form the layer, such that exposure of said film in the vicinity of said frame can be avoided.

23. The method of claim 1 further comprising the additional step of flowing excess resin to a region outside a potentially-exposed film area.

24. The method of claim 23 wherein said flowing step comprises tilting said frame from the horizontal, such that the lowest point of said film or at least one of said films is outside the potentially exposed film area.

25. The method of claim 23 wherein said flowing step comprises providing greater gas pressure on a lower surface of said film or at least one of said films than on an upper surface, so as to make the upper surface convex to allow excess resin to flow to said frame.

26. The method of claim 1 further comprising the additional step of measuring an actual film thickness while draining, followed by exposure once the correct thickness is obtained.

27. The method of claim 26, in which any inaccuracies in film thickness are permitted to accumulate over a plurality of successive films before the net inaccuracy is corrected by a film of carefully-controlled thickness.

28. An apparatus for creating a three-dimensional object through stereolithography comprising:

means for supporting a previously formed portion of said object;

means for creating and supporting a thin liquid resin film by the force of surface tension;

means for applying said film to said previously formed portion of said object;

a source of synergistic stimulation; and means for selectively exposing said film while in contact with said previously formed portion to said synergistic stimulation from said source to effect formation of an additional solid layer of said object.

29. The apparatus of claim 28 further comprising removing means for removing uncured resin from said film.

30. The apparatus of claim 1 further comprising:

a tank for holding liquid curable resin, said tank having a window;

wherein said means for creating and supporting said thin liquid film comprises a funnel with a narrow end in said tank and with a wide end;

detecting means for detecting integrity of a film formed at said narrow end of said funnel and moved to said wide end;

wherein said means for supporting said previously formed portion of said object comprises a platform for supporting said previously formed portion of said object just outside said wide end and for moving said previously formed portion of said object to said wide end;

wherein said source of synergistic stimulation is selectively applicable to said film at said wide end through said window.

31. The apparatus of claim 30 further comprising a valve in said tank for letting resin stripper into said tank and said funnel.

32. The apparatus of claim 30 further comprising air-pressure regulating means for regulating air-pressure in said tank.

33. The apparatus of claim 30 further comprising an interferometer for measuring the thickness of said film.

34. The apparatus of claim 30 further comprising drainage means for draining excess liquid from said funnel away from said window.

35. The apparatus of claim 30 further comprising a reverse taper at said wide end.

36. The apparatus of claim 30 wherein said window and said source are positioned to create a guard band on said film.

37. The apparatus of claim 1 wherein:

said means for creating and forming said thin liquid film comprises a selected one of a plurality of rotatable funnels; and wherein said apparatus further comprises rotating means for rotating said plurality of funnels.

38. The apparatus of claim 37 further comprising a frame capable of receiving said film from said selected funnel.

39. The apparatus of claim 38 further comprising a mechanism for vertically moving said selective exposing means to contact said frame.

40. The apparatus of claim 37 further comprising a plurality of ridges on the inside of at least one of said plurality of funnels.

41. The apparatus of claim 37 wherein at least one of said plurality of funnels has a circular cross-section.

42. The apparatus of claim 37 further comprising a tank in which a narrow end of one of said plurality can be at least partially inserted, for initially forming said film across said narrow end.

43. The apparatus of claim 42 further comprising air pressure adjustment means for causing a difference in air pressure between said narrow end and said wide end.

44. The apparatus of claim 43 wherein said applying means applies a stretched film to said previously formed portion of said object.

45. The apparatus of claim 1 wherein said means for creating and supporting said film includes:

a first film carrier;

a delivery system for delivering a liquid resin to said film carrier; and a squeegee for creating said film from said portion across said film carrier; and wherein said apparatus further comprises a vat with a resin-tight piston for changing the vertical position of an object being formed; and a drive mechanism for moving said film carrier into position for transferring said film to said vat.

46. The apparatus of claim 45 wherein said means for creating and supporting said film further includes a second film carrier movable by said drive mechanism approximately simultaneously with said first film carrier.

47. The apparatus of claim 46 further comprising drip-catching means over which said drive mechanism can move said first and second film carriers.

48. The apparatus of claim 47 further comprising a retractable drip needle on each of said first and second film carriers.

49. The apparatus of claim 47 wherein said drip-catching means is below a tapered top edge of said vat.

50. The apparatus of claim 45 further comprising air pressure means for creating an air pressure differential across said film.

51. The apparatus of claim 45 further comprising an interferometer for measuring the thickness of said film.

52. The apparatus of claim 1 wherein said means for creating and supporting said film comprises means for creating and supporting a flat film having a small aspect ratio.

* * * * *